(12) United States Patent
Arndt et al.

(10) Patent No.: US 10,793,745 B2
(45) Date of Patent: Oct. 6, 2020

(54) DUAL-CURE RESINS AND RELATED METHODS

(71) Applicant: Formlabs, Inc., Somerville, MA (US)

(72) Inventors: Eric Arndt, Everett, MA (US); Gayla Lyon, Somerville, MA (US); Zachary Zguris, Canterbury, NH (US)

(73) Assignee: Formlabs, Inc., Somerville, MA (US)

( * ) Notice: Subject to any disclaimer, the term of this patent is extended or adjusted under 35 U.S.C. 154(b) by 0 days.

(21) Appl. No.: 16/377,003

(22) Filed: Apr. 5, 2019

(65) Prior Publication Data

US 2019/0233673 A1 Aug. 1, 2019

Related U.S. Application Data

(63) Continuation of application No. 15/583,083, filed on May 1, 2017, now Pat. No. 10,316,213.

(51) Int. Cl.
| | |
|---|---|
| *C09D 175/02* | (2006.01) |
| *C09D 175/04* | (2006.01) |
| *B33Y 70/00* | (2020.01) |
| *B33Y 10/00* | (2015.01) |
| *B29C 64/106* | (2017.01) |
| *B29C 64/277* | (2017.01) |
| *C08G 18/08* | (2006.01) |
| *C08G 18/76* | (2006.01) |
| *C08G 18/32* | (2006.01) |
| *C08G 18/38* | (2006.01) |
| *C08G 18/20* | (2006.01) |

(Continued)

(52) U.S. Cl.
CPC ............ *C09D 175/02* (2013.01); *B33Y 10/00* (2014.12); *B33Y 70/00* (2014.12); *C08G 18/089* (2013.01); *C08G 18/10* (2013.01); *C08G 18/2081* (2013.01); *C08G 18/246* (2013.01); *C08G 18/3206* (2013.01); *C08G 18/3281* (2013.01); *C08G 18/3838* (2013.01); *C08G 18/4854* (2013.01); *C08G 18/7671* (2013.01); *C09D 175/04* (2013.01)

(58) Field of Classification Search
CPC .... C09D 175/02; C09D 175/04; B33Y 10/00; B33Y 70/00; B29C 64/106; B29C 64/277; B29C 35/08
See application file for complete search history.

(56) References Cited

U.S. PATENT DOCUMENTS

| | | |
|---|---|---|
| 3,726,835 A | 4/1973 | Bertozzi |
| 3,947,426 A | 3/1976 | Lander |

(Continued)

FOREIGN PATENT DOCUMENTS

| | | |
|---|---|---|
| CN | 1270614 A | 10/2000 |
| CN | 101776846 A | 7/2010 |

(Continued)

OTHER PUBLICATIONS

U.S. Appl. No. 15/583,083, filed May 1, 2017, Arndt et al.
(Continued)

*Primary Examiner* — Robert D Harlan
(74) *Attorney, Agent, or Firm* — Wolf, Greenfield & Sacks, P.C.

(57) ABSTRACT

The present disclosure relates generally to curable resins, in particular dual-cure resins, and related methods for use in an additive fabrication (e.g., 3-dimensional printing) device.

21 Claims, 14 Drawing Sheets

(51) Int. Cl.
  *C08G 18/10* (2006.01)
  *C08G 18/48* (2006.01)
  *C08G 18/24* (2006.01)

(56) References Cited

U.S. PATENT DOCUMENTS

| | | |
|---|---|---|
| 4,463,143 A | 7/1984 | Holubka |
| 4,528,081 A | 7/1985 | Lien et al. |
| 4,575,330 A | 3/1986 | Hull |
| 4,603,168 A | 7/1986 | Sasaki et al. |
| 4,801,477 A | 1/1989 | Fudim |
| 4,961,154 A | 10/1990 | Pomerantz et al. |
| 4,996,282 A | 2/1991 | Noren et al. |
| 5,059,359 A | 10/1991 | Hull et al. |
| 5,122,441 A | 6/1992 | Lawton et al. |
| 5,143,663 A | 9/1992 | Leyden et al. |
| 5,143,817 A | 9/1992 | Lawton et al. |
| 5,171,490 A | 12/1992 | Fudim |
| 5,182,056 A | 1/1993 | Spence et al. |
| 5,192,559 A | 3/1993 | Hull et al. |
| 5,198,159 A | 3/1993 | Nakamura et al. |
| 5,236,637 A | 8/1993 | Hull |
| 5,247,180 A | 9/1993 | Mitcham et al. |
| 5,263,130 A | 11/1993 | Pomerantz et al. |
| 5,271,882 A | 12/1993 | Shirahata et al. |
| 5,310,869 A | 5/1994 | Lewis et al. |
| 5,391,072 A | 2/1995 | Lawton et al. |
| 5,418,112 A | 5/1995 | Mirle et al. |
| 5,447,822 A | 9/1995 | Hull et al. |
| 5,468,831 A | 11/1995 | Lenke et al. |
| 5,510,226 A | 4/1996 | Lapin et al. |
| 5,523,193 A | 6/1996 | Nelson |
| 5,529,473 A | 6/1996 | Lawton et al. |
| 5,554,336 A | 9/1996 | Hull |
| 5,569,431 A | 10/1996 | Hull |
| 5,573,721 A | 11/1996 | Gillette |
| 5,597,520 A | 1/1997 | Smalley et al. |
| 5,609,812 A | 3/1997 | Childers et al. |
| 5,609,813 A | 3/1997 | Allison et al. |
| 5,630,981 A | 5/1997 | Hull |
| 5,637,169 A | 6/1997 | Hull et al. |
| 5,651,934 A | 7/1997 | Almquist et al. |
| 5,674,921 A | 10/1997 | Regula et al. |
| 5,679,719 A | 10/1997 | Klemarczyk et al. |
| 5,695,708 A | 12/1997 | Karp et al. |
| 5,732,477 A | 3/1998 | Toyama |
| 5,762,856 A | 6/1998 | Hull |
| 5,772,947 A | 6/1998 | Hull et al. |
| 5,779,967 A | 7/1998 | Hull |
| 5,785,918 A | 7/1998 | Hull |
| 5,807,519 A | 9/1998 | Suzuki et al. |
| 5,814,265 A | 9/1998 | Hull |
| 5,824,252 A | 10/1998 | Miyajima |
| 5,863,486 A | 1/1999 | Ozaki et al. |
| 5,945,058 A | 8/1999 | Manners et al. |
| 5,972,563 A | 10/1999 | Steinmann et al. |
| 6,027,324 A | 2/2000 | Hull |
| 6,027,682 A | 2/2000 | Almquist et al. |
| 6,036,910 A | 3/2000 | Tamura et al. |
| 6,054,250 A | 4/2000 | Sitzmann et al. |
| 6,281,307 B1 | 8/2001 | Muhlebach et al. |
| 6,391,245 B1 | 5/2002 | Smith |
| 6,451,870 B1 | 9/2002 | DeCato et al. |
| 6,500,378 B1 | 12/2002 | Smith |
| 6,547,552 B1 | 4/2003 | Fudim |
| 6,563,207 B2 | 5/2003 | Shinma |
| 6,617,413 B1 | 9/2003 | Bruchmann et al. |
| 6,652,799 B2 | 11/2003 | Seng et al. |
| 6,942,830 B2 | 9/2005 | Mulhaupt et al. |
| 7,023,432 B2 | 4/2006 | Fletcher et al. |
| 7,049,370 B2 | 5/2006 | Lettmann et al. |
| 7,052,263 B2 | 5/2006 | John |
| 7,090,910 B2 | 8/2006 | Courtoy et al. |
| 7,105,584 B2 | 9/2006 | Chambers et al. |
| 7,195,472 B2 | 3/2007 | John |
| 7,300,619 B2 | 11/2007 | Napadensky et al. |
| 7,318,718 B2 | 1/2008 | Ueno |
| 7,438,846 B2 | 10/2008 | John |
| 7,556,490 B2 | 7/2009 | Wicker et al. |
| 7,573,561 B2 | 8/2009 | Fries |
| 7,629,400 B2 | 12/2009 | Hyman |
| 7,636,610 B2 | 12/2009 | Schillen et al. |
| 7,709,544 B2 | 5/2010 | Doyle et al. |
| 7,783,371 B2 | 8/2010 | John et al. |
| 7,790,093 B2 | 9/2010 | Shkolnik et al. |
| 7,794,790 B2 | 9/2010 | Michels et al. |
| 7,831,328 B2 | 11/2010 | Schillen et al. |
| 7,845,930 B2 | 12/2010 | Shkolnik et al. |
| 7,892,474 B2 | 2/2011 | Shkolnik et al. |
| 7,894,921 B2 | 2/2011 | John et al. |
| 7,962,238 B2 | 6/2011 | Shkolnik et al. |
| 8,003,040 B2 | 8/2011 | El-Siblani |
| 8,110,135 B2 | 2/2012 | El-Siblani |
| 8,126,580 B2 | 2/2012 | El-Siblani et al. |
| 8,286,236 B2 | 10/2012 | Jung et al. |
| RE43,955 E | 2/2013 | Shkolnik et al. |
| 8,372,330 B2 | 2/2013 | El-Siblani et al. |
| 8,394,313 B2 | 3/2013 | El-Siblani et al. |
| 8,404,173 B2 | 3/2013 | Cregger |
| 8,465,689 B2 | 6/2013 | Sperry et al. |
| 8,524,816 B2 | 9/2013 | Badyrka et al. |
| 8,658,076 B2 | 2/2014 | El-Siblani |
| 8,757,789 B2 | 6/2014 | Van Thillo et al. |
| 8,758,860 B1 | 6/2014 | Pyles et al. |
| 9,034,568 B2 | 5/2015 | McLeod et al. |
| 9,360,757 B2 | 6/2016 | DeSimone et al. |
| 9,453,142 B2 | 9/2016 | Rolland et al. |
| 9,498,920 B2 | 11/2016 | DeSimone et al. |
| 9,598,606 B2 | 3/2017 | Rolland et al. |
| 9,676,963 B2 | 6/2017 | Rolland et al. |
| 10,316,213 B1 | 6/2019 | Arndt et al. |
| 2002/0120068 A1 | 8/2002 | Soane et al. |
| 2003/0090034 A1 | 5/2003 | Mulhaupt et al. |
| 2003/0173713 A1 | 9/2003 | Huang |
| 2004/0023145 A1 | 2/2004 | Moussa et al. |
| 2004/0052966 A1 | 3/2004 | Wilke et al. |
| 2004/0084520 A1 | 5/2004 | Muehl et al. |
| 2004/0110856 A1 | 6/2004 | Young et al. |
| 2004/0126694 A1 | 7/2004 | Devoe et al. |
| 2004/0135292 A1 | 7/2004 | Coats et al. |
| 2005/0048404 A1 | 3/2005 | Okamoto |
| 2005/0101684 A1 | 5/2005 | You et al. |
| 2005/0209427 A1 | 9/2005 | Detrembleur et al. |
| 2006/0051394 A1 | 3/2006 | Moore et al. |
| 2006/0066006 A1 | 3/2006 | Haraldsson et al. |
| 2006/0223901 A1 | 10/2006 | Xu |
| 2006/0239986 A1 | 10/2006 | Perez-Luna et al. |
| 2007/0063389 A1 | 3/2007 | John |
| 2007/0205528 A1 | 9/2007 | Patel et al. |
| 2007/0260349 A1 | 11/2007 | John et al. |
| 2008/0038396 A1 | 2/2008 | John et al. |
| 2008/0063867 A1 | 3/2008 | Schlienger et al. |
| 2008/0113293 A1 | 5/2008 | Shkolnik et al. |
| 2008/0174050 A1 | 7/2008 | Kikuchi |
| 2008/0220339 A1 | 9/2008 | Zakrevskyy et al. |
| 2009/0020901 A1 | 1/2009 | Schillen et al. |
| 2009/0061152 A1 | 3/2009 | DeSimone et al. |
| 2009/0099600 A1 | 4/2009 | Moore et al. |
| 2009/0130449 A1 | 5/2009 | El-Siblani |
| 2009/0132081 A1 | 5/2009 | Schillen et al. |
| 2009/0137750 A1 | 5/2009 | Ludewig et al. |
| 2009/0146344 A1 | 6/2009 | El-Siblani |
| 2010/0022676 A1 | 1/2010 | Rogers et al. |
| 2010/0105794 A1 | 4/2010 | Dietliker et al. |
| 2010/0140850 A1 | 6/2010 | Napadensky et al. |
| 2010/0247876 A1 | 9/2010 | Omino et al. |
| 2010/0249979 A1 | 9/2010 | John et al. |
| 2010/0304088 A1 | 12/2010 | Steeman et al. |
| 2010/0323301 A1 | 12/2010 | Tang |
| 2011/0009992 A1 | 1/2011 | Shkolnik et al. |
| 2011/0062633 A1 | 3/2011 | Shkolnik et al. |
| 2011/0089610 A1 | 4/2011 | El-Siblani et al. |
| 2011/0101570 A1 | 5/2011 | John et al. |
| 2011/0196529 A1 | 8/2011 | Shkolnik et al. |

(56) References Cited

U.S. PATENT DOCUMENTS

| | | |
|---|---|---|
| 2011/0260365 A1 | 10/2011 | El-Siblani |
| 2012/0007287 A1 | 1/2012 | Vermeer et al. |
| 2012/0027964 A1 | 2/2012 | Hood et al. |
| 2012/0058314 A1 | 3/2012 | Mikami et al. |
| 2012/0077038 A1 | 3/2012 | Pyles et al. |
| 2012/0080824 A1 | 4/2012 | Sullivan et al. |
| 2012/0095162 A1 | 4/2012 | Bruchmann et al. |
| 2012/0251841 A1 | 10/2012 | Southwell et al. |
| 2013/0184384 A1 | 7/2013 | Liu et al. |
| 2013/0252178 A1 | 9/2013 | McLeod et al. |
| 2013/0276653 A1 | 10/2013 | Daems et al. |
| 2013/0292862 A1 | 11/2013 | Joyce |
| 2013/0295212 A1 | 11/2013 | Chen et al. |
| 2013/0304233 A1 | 11/2013 | Dean et al. |
| 2013/0309448 A1 | 11/2013 | Striegler et al. |
| 2014/0010858 A1 | 1/2014 | Stankus et al. |
| 2014/0055544 A1 | 2/2014 | Iraqi et al. |
| 2014/0072806 A1 | 3/2014 | Allen et al. |
| 2014/0085620 A1 | 3/2014 | Lobovsky et al. |
| 2014/0109784 A1 | 4/2014 | Daems et al. |
| 2014/0128132 A1 | 5/2014 | Cox, III |
| 2014/0265034 A1 | 9/2014 | Dudley |
| 2014/0361463 A1 | 12/2014 | DeSimone et al. |
| 2015/0050473 A1 | 2/2015 | Seo et al. |
| 2015/0072293 A1 | 3/2015 | DeSimone et al. |
| 2015/0097316 A1 | 4/2015 | DeSimone et al. |
| 2015/0290876 A1 | 10/2015 | Liu et al. |
| 2015/0322291 A1 | 11/2015 | Salviato et al. |
| 2016/0059484 A1 | 3/2016 | DeSimone et al. |
| 2016/0059486 A1 | 3/2016 | DeSimone et al. |
| 2016/0059487 A1 | 3/2016 | DeSimone et al. |
| 2016/0136889 A1 | 5/2016 | Rolland et al. |
| 2016/0137838 A1 | 5/2016 | Rolland et al. |
| 2016/0137839 A1 | 5/2016 | Rolland et al. |
| 2016/0160077 A1 | 6/2016 | Rolland et al. |
| 2018/0229436 A1* | 8/2018 | Gu .................. B33Y 70/00 |

FOREIGN PATENT DOCUMENTS

| | | |
|---|---|---|
| CN | 102746785 A | 10/2012 |
| CN | 103029301 A | 4/2013 |
| CN | 203254661 U | 10/2013 |
| CN | 103895231 A | 7/2014 |
| DE | 4125534 A1 | 2/1993 |
| DE | 9319405 U1 | 3/1994 |
| DE | 4326986 C1 | 12/1994 |
| DE | 202013103446 U1 | 8/2013 |
| EP | 0484086 A1 | 5/1992 |
| EP | 0830641 A1 | 3/1998 |
| EP | 0945744 A2 | 9/1999 |
| EP | 1341039 A1 | 9/2003 |
| EP | 1918316 A1 | 5/2008 |
| EP | 2503391 A2 | 9/2012 |
| EP | 2955004 A1 | 12/2015 |
| EP | 2956823 B1 | 12/2015 |
| IT | 274727 | 10/2011 |
| JP | H08-192469 A | 7/1996 |
| NL | 1002739 C2 | 5/1997 |
| WO | WO 95/13565 A1 | 5/1995 |
| WO | WO 96/00412 A1 | 1/1996 |
| WO | WO 98/36323 A1 | 8/1998 |
| WO | WO 99/09103 A1 | 2/1999 |
| WO | WO 99/52017 A1 | 10/1999 |
| WO | WO 01/72501 A1 | 10/2001 |
| WO | WO 03/029366 A1 | 4/2003 |
| WO | WO 03/104296 A1 | 12/2003 |
| WO | WO 2004/022318 A2 | 3/2004 |
| WO | WO 2005/110722 A1 | 11/2005 |
| WO | WO 2008/055533 A1 | 5/2008 |
| WO | WO 2008/076184 A1 | 6/2008 |
| WO | WO 2008/119688 A1 | 10/2008 |
| WO | WO 2009/003696 A2 | 1/2009 |
| WO | WO 2009/005576 A1 | 1/2009 |
| WO | WO 2009/021256 A1 | 2/2009 |
| WO | WO 2009/053099 A1 | 4/2009 |
| WO | WO 2009/053100 A1 | 4/2009 |
| WO | WO 2009/053100 A8 | 4/2009 |
| WO | WO 2009/070877 A1 | 6/2009 |
| WO | WO 2010/064733 A1 | 6/2010 |
| WO | WO 2010/077097 A2 | 7/2010 |
| WO | WO 2011/086450 A2 | 7/2011 |
| WO | WO 2011/111957 A2 | 9/2011 |
| WO | WO 2012/024675 A9 | 2/2012 |
| WO | WO 2012/041519 A2 | 4/2012 |
| WO | WO 2012/045660 A1 | 4/2012 |
| WO | WO 2014/020400 A2 | 2/2014 |
| WO | WO 2014/095724 A1 | 6/2014 |
| WO | WO 2014/126830 A2 | 8/2014 |
| WO | WO 2014/126834 A2 | 8/2014 |
| WO | WO 2014/126837 A2 | 8/2014 |
| WO | WO 2014/165265 A1 | 10/2014 |
| WO | WO 2015/002071 A1 | 1/2015 |
| WO | WO 2015/017421 A2 | 2/2015 |
| WO | WO 2015/077419 A1 | 5/2015 |
| WO | WO 2015/164234 A1 | 10/2015 |
| WO | WO 2015/195909 A1 | 12/2015 |
| WO | WO 2015/195920 A1 | 12/2015 |
| WO | WO 2015/195924 A1 | 12/2015 |
| WO | WO 2015/200173 A1 | 12/2015 |
| WO | WO 2015/200179 A1 | 12/2015 |
| WO | WO 2015/200189 A1 | 12/2015 |
| WO | WO 2015/200201 A1 | 12/2015 |
| WO | WO 2016/126779 A1 | 8/2016 |
| WO | WO 2016/145050 A1 | 9/2016 |

OTHER PUBLICATIONS

3D Printing Forum, 3D Print Board, Kudo3D Titan1, Same Technology as Form 1?, May 30, 2014. 1 page.

3DSYSTEMS, Projet 1200, Micro-SLA, Low-Cost Professional 3D Printer, 2013, 2 pages.

3DSYSTEMS, V-Flash, Personal 3D Printer, 2011, 2 pages.

Adzima, Brian, The Ember Printer: An Open Platform for Software, Hardware, and Materials Development, Adzima.sub.--UV.ebWest2015, printed from the internet on Mar. 16, 2015 at URL https://www.slideshare.net/slideshow/embed.sub.--code/45733940. 29 pages.

Anderson C. "Dreaming in 3D", Wired, Oct. 2012, p. 136-143 (2012).

Atala et al. "Engineering Complex Tissues", Science Translational Medicine, Nov. 14, 2012, vol. 4, Issue 160, 11 Pages.

B9Creator, Topic: PDMS and VAT, Feb. 19, 2013, 3 pages.

B9Creator, Topic: PDMS replacement advice sough: thanks in advance, Dec. 12, 2012, 2 pages.

B9Creator, Topic: Resin Technology/Discssion, Nov. 30, 2012, 5 pages.

BASF, The Chemical Company, Photoacid Generator Selection Guide for the Electronics Industry and Energy Curable Coatings, 2010, 3 pages.

Bauer et al. "25$^{th}$ Anniversary Article: A Soft Future: From Robots and Sensor Skin to Energy Harvesters", Adv. Mater., 2014, 26, 149-162.

Bauer et al. "High-strength cellular ceramic composites with 3D microarchitecture", PNAS, Feb. 18, 2014, vol. 111, No. 7, 2453-2458.

Bedal B. et al. "Advances in Part Accuracy", Stereolithography and Other RP&M Technologies, from Rapid Prototyping to Rapid Tooling, Paul F. Jacobs, Ph.D., Society of Manufacturing Engineers, p. 149-181, (1996).

Bertsch, A. et al. "Rapid prototyping of small size objects", Rapid Prototyping Journal, 2000, vol. 6, No. 4, pp. 259-266.

Bhattacharjee et al. "Writing in the granular gel medium", Sci. Adv., 2015;1:e1500655, Sep. 25, 2015. 6 pages.

Bichler et al. "Functional flexible organic-inorganic hybrid polymer for tow photon patterning of optical waveguides", Optical Materials, vol. 34, Issue 5, Mar. 2012, pp. 772-780.

Burns, M. "Automated Fabrication—Improving Productivity in Manufacturing", 1993 (ISBN 0-13-119462-3) pp. 40-49.

(56) References Cited

OTHER PUBLICATIONS

Bylinsky, Gene "Industry's Amazing New Instant Prototypes", Reporter Associate Alicia Hills Moore, Jan. 12, 1998, 12 Pages.

Chakraborty et al. "Coarse-grained foldable, physical model of the polypeptide chain", PNAS, Aug. 13, 2013, vol. 110, No. 33, 13368-13373.

Chen Y. et al. "A layerless additive manufacturing process based on CNC accumulation", Rapid Prototyping Journal, 2011, vol. 17, No. 3, pp. 218-227.

Chisholm et al. "3D printed flow plates for the electrolysis of water: an economic and adaptable approach to device manufacture", Energy Environ. Sci, 2014, 7, 3026-3032.

Choi J. et al. "Multiple-material stereolithography", Journal of Materials Processing Technology, 2011, vol. 211, Issue 3, pp. 318-328.

Choi J. W. et al. "Multi-material microstereolithography", Int. J. Adv. Manuf. Technol., 2010, vol. 49, pp. 543-551.

Cvetkovic et al. "Three-dimensionally printed biological machines powered by skeletal muscle" PNAS, Jul. 15, 2014, vol. 111, No. 28, 10125-10130.

De Jong. "Innovation Lessons From 3-D Printing", MIT Sloan Management Review, Winter 2013, vol. 54, No. 2, p. 43-52 (2013).

Deben Chen et al. "Studies on curing behavior of polyacrylate-epoxy complex coating", European Polymer Journal, Mar./Apr. 1998, p. 523-530.

DelViscio, Jeff, "Incredible New 3D Printing Technique Looks Like Sci-Fi", Popular Mechanics, Mar. 16, 2015, Retrieved from the internet at URL http://www.popularmechanics.com/technology/a14586/carbon3d-3d-printer-res- in/. 9 pages.

Dendukuri D et al. Continuous-flow lithography for high-throughput microparticle synthesis. Nature Materials. May 2006; 5:365-369.

Dendukuri et al. "Continuous-flow lithography for high-throughput microparticle synthesis", Nature Materials, vol. 5, May 2006, 365-369.

Dendukuri et al. "Modeling of Oxygen-Inhibited Free Radical Photopolymerization in a PDMS Microfluidic Device", Macromolecules, 2008, 41:8547-8556.

Dendukuri et al. "Stop-flow lithography in a microfluidic device", The Royal Society of Chemistry, Lab on a Chip, 2007, 7:818-828.

Dendukuri et al. "The Synthesis and Assembly of Polymeric Microparticles Using Microfluidics", Adv. Mater. 2009, 21:4071-4086.

Derby B. "Printing and Prototyping of Tissues and Scaffolds", Science, vol. 338, Nov. 16, 2012, 921-926.

DeSimone J. "What if 3D Printing Was 100x Faster?" TED Presentation Mar. 2015, Filmed Mar. 16, 2015, Vancouver, BC, Canada, 11 Pages.

Deutsch S. "Plastics for 3D Printing", Make: Ultimate Guide to 3D Printing 2014, p. 36-37 (2014).

Deutsch S., "3D Printer Prizefight: Makerbot Replicator 2 vs. Formlabs Form 1", Popular Mechanics, Nov. 14, 2012, 7 pages.

Dougherty D. "A Brief History of Personal 3D Printing", Make: Ultimate Guide to 3D Printing 2014, p. 8 (2014).

Duoss et al. "Three-Dimensional Printing of Elastomeric, Cellular Architectures with Negative Stiffness", Adv. Funct. Mater., 2014, 24, 4905-4913.

Erkal et al. "3D printed microfluidic devices with integrated versatile and reusable electrodes", Lab Chip, 2014, 14, 2023-2032.

Feltman, Rachel, "This mind-blowing new 3-D printing technique is inspired by 'Terminator 2'", The Washington Post, Mar. 16, 2015, Retrieved from the Internet at URL http://www.washingtonpost.com/news/speaking-of-science/wp/2015/03/16/this--new-technology-blows-3d-printing-out-of-the-water-literally/. 3 pages.

Fischer, Dr. Wolfgang et al. "Dual Cure, the Combination of Superiour Properties", European Coatings Conference—Adhesion and Performance Enhancement, Sep. 2001, p. 277-296, Leverkusen, Germany.

Gibson et al. Additive Manufacturing Technologies: Rapid Prototyping to Direct Digital Manufacturing, Spring, New York 2010, 472 Pages.

Gonzalez-Meijome et al. "Determination of Oxygen Permeability in Soft Contact Lenses Using a Polarographic Method: Estimation of relevant Physiological Parameters", Ind. Eng. Chem. Res., 2008, 47, 3619-3629.

Greenemeier L. "To Print the Impossible, Will 3-D printing transform conventional manufacturing?", Scientific American, May 2013, vol. 308, No. 5, p. 44-47.

Griffini et al., 3D-printable CFR polymer composites with dual-cure sequential IPNs. Polymer. May 17, 2016;91:174-9.

Gross et al. "Evaluation of 3D Printing and Its Potential Impact on Biotechnology and the Chemical Sciences", Anal. Chem., 2014, 86, 3240-3253.

Han L. et al. "Fabrication of three-dimensional scaffolds for heterogeneous tissue engineering", Biomed Microdevices, 2010, No. 12, pp. 721-725.

Han L. et al. "Projection Microfabrication of three-dimensional scaffolds for tissue engineering", Journal of Manufacturing Science and Engineering, 2008, vol. 130, 021005. 4 pages.

Hausmann R. "How to Make the Next Big Thing", Scientific American, May 2013, vol. 308, No. 5, p. 36-7.

Ho Won Lee, "Three-Dimensional Micro Fabrication of Active Micro Devices Using Soft Functional Materials", Dissertation, University of Illinois, 2011, Urbana, Illinois, 158 pages.

Hornbeck, Larry J. "Digital Light Processing.TM. For High-Brightness, High-Resolution Applications", Texas Instruments, Feb. 1997, 16 Pages.

Hornbeck, Larry J. From cathode rays to digital micromirrors: A history of electronic projection display technology, Jul.-Sep. 1998, pp. 7-46.

How It Works—Internet Articles, Texas Instruments, Inc., 1997, 15 Pages.

Hribar KC et al. Light-assisted direct-write of 3D functional biomaterials. Lab Chip. Jan. 2014; 14(2): 268-275.

Huang Y.M. et al. "On-line force monitoring of platform ascending rapid prototyping system", Journal of Materials Processing Technology, 2005, vol. 159, pp. 257-264.

Inamdar A. et al. "Development of an automated multiple material stereolithography machine", Proceedings of Annual Solid Freeform Fabrication Symposium, 2006, Austin, TX, pp. 624-635.

Infuehr et al. "Functional polymers by two-photon 3D lithography", Applied Surface Science, vol. 254, Issue 4, Dec. 15, 2007, pp. 836-840.

Jacobs P. "Postprocessing", Rapid Prototyping & Manufacturing, Fundamentals of StereoLithography, First Edition, Paul F. Jacobs, Ph.D., Society of Manufacturing Engineers, p. 221-248. (1992).

Jacobs, P. Fundamental Processes, Rapid Prototyping & Manufacturing, Fundamentals of StereoLithography, First Edition, Paul F. Jacobs, Ph.D., Society of Manufacturing Engineers, p. 79-110. (1992).

Januszkiewicz, Rima et al. "Layerless fabrication with continuous liquid interface production", PNAS Early Edition, Sep. 2016, 6 Pages.

Jariwala et al. "Exposure controlled projection lithography for microlens fabrication", Proc. SPIE 8249, Advanced Fabrication Technologies for Micro/Nano Optics and Photonics V. 824917, Feb. 9, 2012. 13 pages.

Jariwala et al. "Real-Time Interferometric Monitoring System for Exposure Controlled Projection Lithography", Solid Freeform Fabrication Symposium, University of Texas, 2011. 12 pages.

Jeong et al. "UV-assisted capillary force lithography for engineering biomimetic multiscale hierarchical structures: From lotus leaf to gecko foot hairs", Nanoscale, 2009, vol. 1:331-338, The Royal Society of Chemistry 2009.

Kaziunas France A. "3D Printing Buyer's Guide; Here's how we tested, compared, and rated 30 new 3D printers, scanners, and filament bots", Make: Ultimate Guide to 3D Printing 2014, p. 56-95 (2014).

Kickstarter, Form 1: An affordable, professional 3D printer, by Formlabs, Oct. 26, 2012, 13 pages.

(56) References Cited

OTHER PUBLICATIONS

Kim H. et al. "Scheduling and process planning for multiple material stereolithography", Rapid Prototyping J., 2010, vol. 16, No. 4, pp. 232-240.
Kim H. et al. "Slice overlap detection algorithm for the process planning in multiple material stereolithography", Int. J. Adv. Manuf. Technol., 2010, vol. 46, No. 9, pp. 1161-1170.
Kitson et al. "Bringing Crystal Structures to Reality by Three-Dimensional Printing", Crystal Growth & Design, 2014, 14, 2720-2724.
Kudo3D First Print Checklist and PSP Handling Instructions, Version 1.0, 2015. 4 pages.
Kudo3D Titan 1, (Ruby & Diamond Editions), Build Manual, Revision 2.0, 2015. 30 pages.
Kudo3D Titan 1—Printing Guide, Revision 1.4, 2015. 11 pages.
Kudo3D, The Titan 1, High Performance DLP SLA 3D Printer, 2014, 5 pages.
Lee et al. "Advances in 3D nano/microfabrication using two-photon initiated polymerization", Progress in Polymer Science, vol. 33, Issue 6, Jun. 2008, pp. 631-681.
Lemoncurry, Open Source UV Photopolymer DLP 3D Printer, Apr. 30, 2012, 7 pages.
Lemoncurry, Open Source UV Photopolymer DLP 3D Printer, Mar. 4, 2013, 10 pages.
Ligon SC et al. Strategies to reduce oxygen inhibition in photoinduced polymerization. Chemical Reviews. 2014; 114: 557-589.
Lipson H. et al. Fabricated: The New World of 3D Printing, 2013 John Wiley & Sons, Indianapolis, Indiana, Chapters 2 & 5, 50 pages.
Lockman C. "Meet Your Maker, A New Approach to Product Development", Perspectives, College of Business at the University of Illinois at Urbana-Champaign, p. 2-5, Spring 2013.
Lu et al. "A digital micro-mirror device-based system for the microfabrication of complex, spatially patterned tissue engineering scaffolds", J Biomed Mater Res, 77A:396-405, 2006.
Maruo S. et al. "Multi-polymer microstereolithography for hybrid opto-MEMS", Proceedings of the 14.sup.th IEEE International Conference on Micro Electro Mechanical Systems (MEMS 2001), 2001, pp. 151-154.
Merkel et al. "Gas and Vapor Transport Properties of Perfluoropolymers", Chapter 9, Materials Science of Membranes for Gas and Vapor Separation, John Wiley & Sons, Ltd, 2006, 251-270.
Mohammadi G. "Jiving with Jarvis; what would you do with a professional 3D printer", Make: Ultimate Guide to 3D Printing 2014, p. 38-39 (2014).
Mohammadi G. et al. "Meet seven makers who started their won companies, Faces of 3D printing", Make: Ultimate Guide to 3D Printing 2014, p. 25-27 (2014).
Newcomb T. "Foot Prints, Your Next Pair of Sneakers Will Be Printed to Order", Popular Science, p. 22, Jul. 2013.
Pan Y et al. A fast mask projection stereolithography process for fabricating digital models in minutes. Journal of Manufacturing Science and Engineering. Oct. 2012; 134: pp. 051011-01 to 051011-09.
Park Y-J et al. UV- and thermal-curing behaviors of dual-curable adhesives based on epoxy acrylate oligomers. International Journal of Adhesion and Adhesives. Oct. 2009; 29(7):710-717. Abstract.
Pearce J. "Building Research Equipment with Free, Open-Source Hardware", Science, vol. 337, Sep. 14, 2012, 1303-1304.
Rogers et al. "Materials and Mechanicals for Stretchable Electronics", Science, vol. 327, Mar. 26, 2010, 1603-1607.
Royte E. "The Printed World, 3-D Printing Promises a Factory in Every Home and a Whole Lot More", Smithsonian, May 2013, p. 50-57 (2013).
Schaedler et al. "Ultralight Metallic Microlattices", Science, vol. 334, Nov. 18, 2011, 962-965.
Shi J et al. Spatially controlled oxygen inhibition of acrylate photopolymerization as a new lithography method for high-performance organic thin-film transistors. Chemistry of Materials. 2010; 22(7): 2341-2346.
Stern S.A. "The 'Barrer' Permeability Unit", Journal of Polymer Science: Part A-2, vol. 6, p. 1933-1934 (1968).
Studer, Katia et al. "Dual Cured Polyurethane-Polyacrylate Coatings", Europeans Coating Conference—Polyurethanes for High Performance Coatings III, Mar. 2004, p. 49-63, Berlin, Germany.
Stultz M. "Metal Madness; Move past plastic—use your 3D printer to cast objects in metal", Make: Ultimate Guide to 3D Printing 2014, p. 48-49 (2014).
Suh et al. "Using Stop-Flow Lithography to Produce Opaque Microparticles: Synthesis and Modeling", Langmuir, 2011, 27, 13813-13819.
Sun C.N. et al. "Projection micro-stereolithography using digital micro-mirror dynamic mask", Sensors and Actuators A., 2005, vol. 121, pp. 113-120.
Sun et al. "3D Printing of Interdigitated Li-Ion Microbattery Architectures", Adv. Mater., 2013, 25, 4539-4543.
Symes et al. "Integrated 3D-printed reactionware for chemical synthesis and analysis", Nature Chemistry, vol. 4, May 2012, 349-354.
Tassel X. et al. "A new blocking agent of isocyanates", European Polymer Journal, 36(9), 1745-1751 (2000).
Thangawng et al. "UV Polymerization of Hydrodynamically Shaped Fibers", ESI Lab on a Chip, Royal Society of Chemistry, 2011. 5 pages.
Titsch M. "Kudo3D's Titan 1 Approaches $400K on Kickstarter", Jun. 5, 2014, 4 pages.
Travitzky et al. "Additive Manufacturing of Ceramic-Based Materials", Advanced Engineering Materials, vol. 16, No. 6, 2014, 729-754.
Tumbleston et al. Continuous liquid interface production of 3D objects, Science, Mar. 20, 2015, 347, 1349-52.
Tumbleston et al. Supplementary Materials for Continuous liquid interface production of 3D objects, Science, Mar. 16, 2015, 347, 1349-52. 13 pages.
Urness et al. "Liquid deposition photolithography for submicrometer resolution three-dimensional index structuring with large throughput", Light: Science & Applications (2013) 2, e56. 6 pages.
Urness et al. "Liquid deposition photolithography for sub-micron resolution three-dimensional index structuring with large throughput", Supplementary Information, 2013, 10 pages.
Urness et al. "Lithographic Fabrication of Multi-Layered Optical Data Storage", NLO/ISOM/ODS, 2011 OSA, OME2, 3 pages.
Urness, Adam C. (2013) Liquid Deposition Photolithography for Efficient Three Dimensional Structuring, Doctoral Dissertation, University of Colorado. 179 pages.
Velankar et al. "High-Performance UV-Curable Urethane Acrylates via Deblocking Chemistry", Journal of Applied Polymer Science, vol. 62, Issue 9, 1361-1376, Nov. 28, 1996.
Wicker R. et al. "Multiple material micro-fabrication: extending stereo lithography to tissue engineering and other novel applications", Proceedings of Annual Solid Freeform fabrication Symposium, 2005, Austin, TX, pp. 754-764.
Wohlers, Terry "Eight years of rapid prototyping", RP Direct, 1997 Directory, 9 pages.
Yagci et al. "Photoinitiated Polymerization: Advances, Challenges, and Opportunities", Macromolecules, 2010, 43, 6245-6260.
Yasuda H. "Permeability of Polymer Membranes to Dissolved Oxygen", Journal of Polymer Science, vol. 4, p. 1314-1316 (1966).
Ying et al. "Hydrolyzable Polyureas Bearing Hindered Urea Bonds", Journal of the American Chemical Society, 136, 16974-16977, (2014).
Zheng et al. "Ultralight, Ultrastiff Mechanical Metamaterials", Science, vol. 344, Issue 6190, Jun. 20, 2014, 1373-1377.
Zhou C et al. Digital material fabrication using mask-image-projection-based sterolithography. http://www.bcf.usc.edu/.about.youngchen/Research/Digital.sub.--Material.s-ub.--2012.pdf, pp. 1/16 to 16/16, also published in: Rapid Prototyping Journal.Apr. 2013; 19(3):153-165.
Zhou, "Development of a Multi-material Mask-Image-Projection-based Stereolithography for the Fabrication of Digital Materials", Paper, presented at Solid Freeform Fabrication Symposium 2011, held Aug. 8-10, 2011, 16 pages., University of SouthernCalifornia,

(56) References Cited

OTHER PUBLICATIONS

Los Angeles, USA, available at URL http://utwired.engr.utexas.edu/lff/symposium/proceedingsArchive/pubs/Manuscripts/2011/2011-06-Zhou.pdf.

* cited by examiner 4,4' methylene diphenyl diisocyanate

MDI-PolyTHF-MDI diisocyanate oligomer

DUAL-CURE RESINS AND RELATED METHODS

CROSS REFERENCE TO RELATED APPLICATIONS

The present application claims the benefit as a continuation under 35 U.S.C. § 120 of U.S. application Ser. No. 15/583,083, filed May 1, 2017, which is hereby incorporated by reference in its entirety.

BACKGROUND

Additive fabrication, e.g., 3-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof. Many additive fabrication techniques build objects by forming successive layers, which are typically cross-sections of the desired object. Typically each layer is formed such that it adheres to either a previously formed layer or a substrate upon which the object is built. In one approach to additive fabrication, known as stereolithography, solid objects are created by successively forming thin layers of a curable polymer resin, typically first onto a substrate and then one on top of another. Exposure to actinic radiation cures a thin layer of liquid resin, which causes it to harden and adhere to previously cured layers or to the bottom surface of the build platform.

Every additive manufacturing technology requires some form of specialized material. Additive manufacturing techniques using light to cure a liquid material, such as stereolithography (SLA and DLP), into an object require photocurable materials.

Many current additive manufacturing materials are formed from polymeric (meth)acrylates. (Meth)acrylates are useful in 3D printing applications because the monomers and oligomers are highly reactive through radical photopolymerization. This reactivity allows for the printing process to proceed more quickly and efficiently with a higher degree of accuracy. However, the reactivity may also introduce less favorable qualities or limit the types of qualities available in a 3D printing process. The end material may be brittle because the resulting polymer is generally inhomogeneous and highly crosslinked. As additive manufacturing pushes to be applicable in more functional prototyping or end-use applications, the material capabilities of (meth)acrylate based polymers become a limiting factor.

Accordingly there is a need in the art for new materials and expanded material properties for applications of additive manufacturing.

SUMMARY

The present disclosure relates generally to curable resins, in particular dual-cure resins, and related methods for use in an additive fabrication (e.g., 3-dimensional printing) device.

According to one or more embodiments, dual-cure resins for use in additive manufacturing are provided.

In some embodiments, the dual-cure resin may comprise a photo-curable component, configured to cure when subjected to an effective amount of actinic radiation, and a secondary component. The secondary component may comprise a first secondary precursor species and a second secondary precursor species. The first secondary precursor species may be configured to be physically isolated or substantially physically isolated from the second secondary precursor species until subjected to an initiating event (e.g., a dissolving event or a degrading event) that allows the first and second secondary precursor species to mix and cure. The initiation event may be a stimulus such as heat, mechanical force (e.g., sonication), addition of a catalyst, or some other mechanism.

In some embodiments, the secondary component may comprise a plurality of particles comprising a first secondary precursor species, wherein the plurality of particles are configured to dissolve when subjected to a dissolving event.

In some embodiments, the secondary component may comprise a plurality of encapsulants containing a first secondary precursor species, wherein the plurality of encapsulants are configured to degrade, when subjected to a degrading event, and release the first secondary precursor species for secondary curing.

According to one or more embodiments, methods of producing an additively-manufactured article are provided.

In some embodiments, the method may comprise providing a dual-cure resin comprising a photo-curable component and a secondary component, the secondary component comprising a plurality of particles comprising a first secondary precursor species, the secondary component further comprising a second secondary precursor species. The method may further comprise subjecting the photo-curable component to actinic radiation to produce a photo-cured polymer. The method may further comprise subjecting the secondary component to a dissolving event to dissolve the plurality of particles. The method may further comprise reacting the first secondary precursor species with the second secondary precursor species to produce a secondary polymer, wherein the photo-cured polymer and the secondary polymer form an additively-manufactured article.

In some embodiments, the method may comprise providing a dual-cure resin comprising a photo-curable component and a secondary component, the secondary component comprising a plurality of encapsulants containing a first secondary precursor species, the secondary component further comprising a second secondary precursor species.

The method may further comprise subjecting the photo-curable component to actinic radiation to produce a photo-cured polymer.

The method may further comprise subjecting the secondary component to a degrading event to degrade the plurality of encapsulants and release the first heat-curable precursor species.

The method may further comprise reacting the first secondary precursor species with the second secondary precursor species to produce a secondary polymer, wherein the photo-cured polymer and the secondary polymer form an additively-manufactured article.

The foregoing is a non-limiting summary of the invention, which is defined by the attached claims.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

The present disclosure relates generally to dual-cure resins and related methods for use in an additive fabrication (e.g., 3-dimensional printing) device.

Figure 1A:
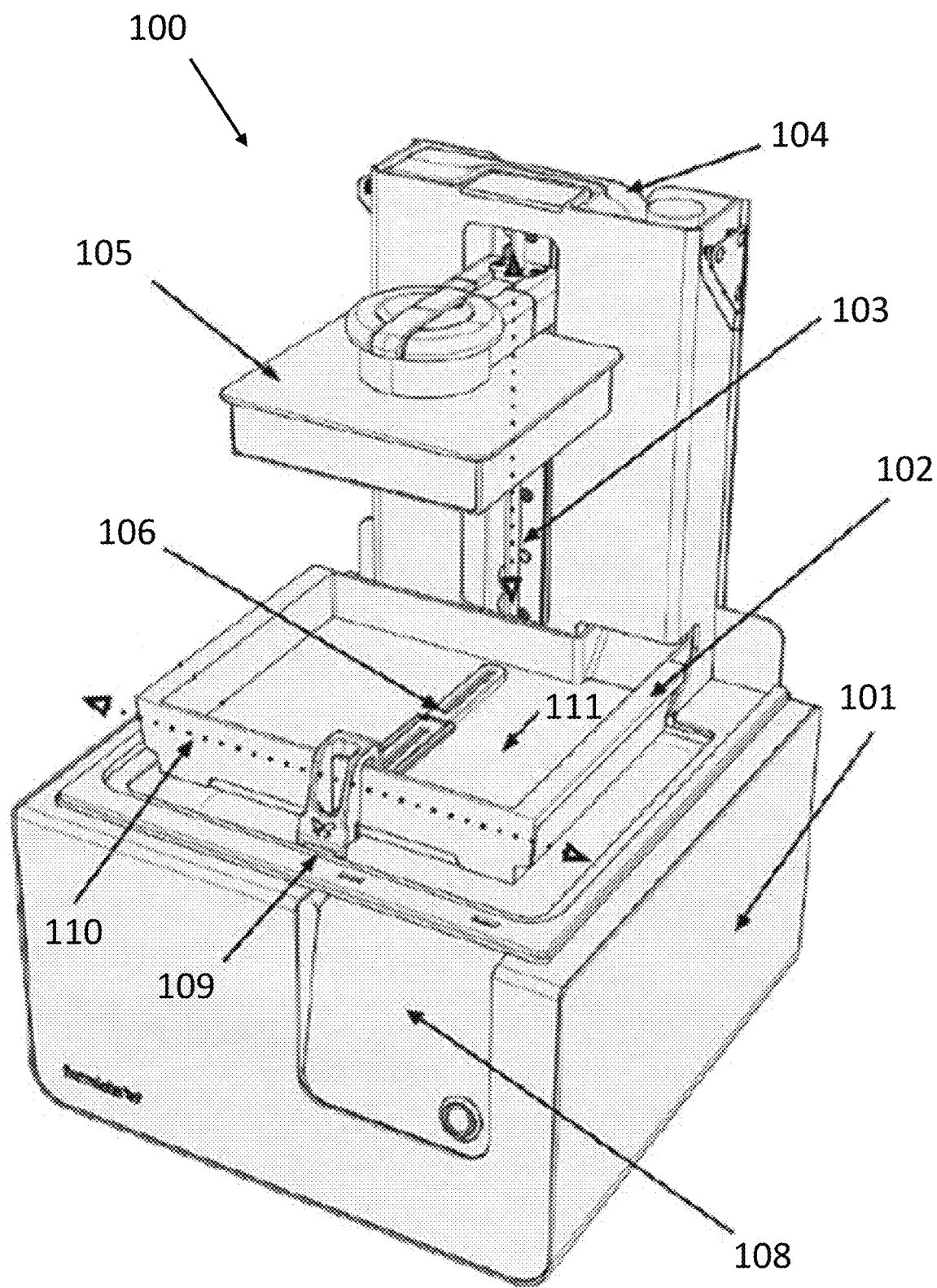
FIGS. 1A-1B depict an illustrative additive fabrication system, according to some embodiments.
Figure 1B:
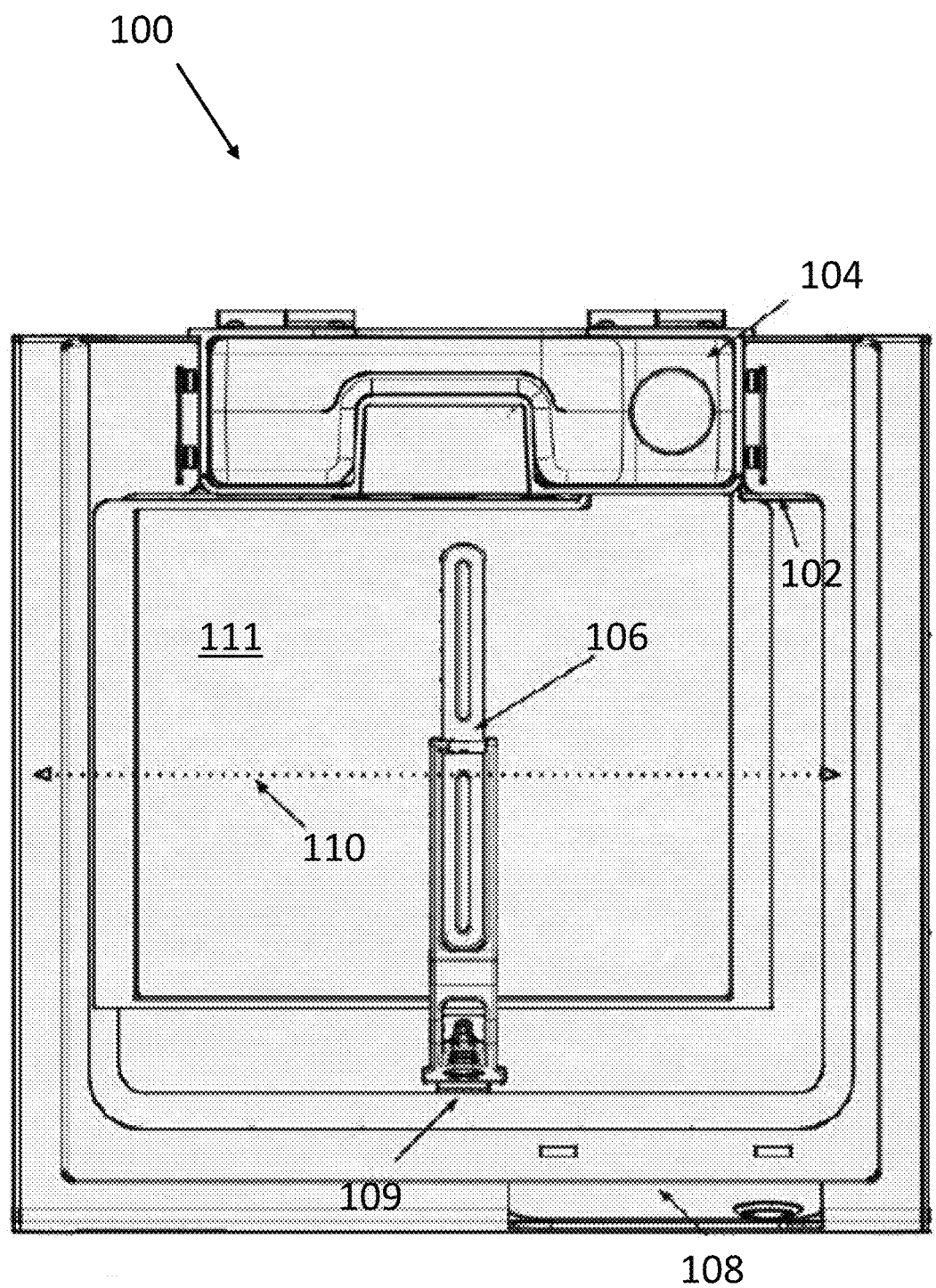

As discussed above, in additive fabrication, a plurality of layers of material may be formed on a build platform. To illustrate one exemplary additive fabrication system, an inverse stereolithographic printer is depicted in FIGS. 1A-B. Illustrative stereolithographic printer 100 comprises a support base 101, a display and control panel 108, and a reservoir and dispensing system 104 for storage and dispensing of photopolymer resin. The support base 101 may contain various mechanical, optical, electrical, and electronic components that may be operable to fabricate objects using the system.

During operation, photopolymer resin may be dispensed from the dispensing system 104 into container 102. Build platform 105 may be positioned along a vertical axis 103 (oriented along the z-axis direction as shown in FIGS. 1A-B) such that the bottom facing layer (lowest z-axis position) of an object being fabricated, or the bottom facing layer of build platform 105 itself, is a desired distance along the z-axis from the bottom 111 of container 102. The desired distance may be selected based on a desired thickness of a layer of solid material to be produced on the build platform or onto a previously formed layer of the object being fabricated.

In the example of FIGS. 1A-B, the bottom 111 of container 102 may be transparent to actinic radiation that is generated by a radiation source (not shown) located within the support base 101, such that liquid photopolymer resin located between the bottom 111 of container 102 and the bottom facing portion of build platform 105 or an object being fabricated thereon, may be exposed to the radiation. Upon exposure to such actinic radiation, the liquid photopolymer may undergo a chemical reaction, sometimes referred to as "curing," that substantially solidifies and attaches the exposed resin to the bottom facing portion of build platform 105 or to an object being fabricated thereon.

FIG. 1A-B represent a configuration of stereolithographic printer 101 prior to formation of any layers of an object on build platform 105, and for clarity also omits any liquid photopolymer resin from being shown within the depicted container 102.

Following the photo-curing of a layer of material, a separation process is typically conducted so as to break any bonds (e.g., adhesive bonds) that may have been produced between the cured material and the bottom 111 of container 102. As one example, build platform 105 may be moved along the vertical axis of motion 103 in order to reposition the build platform 105 for the formation of a new layer and/or to impose separation forces upon any bond with the bottom 111 of container 102. In addition, container 102 is mounted onto the support base such that the stereolithographic printer 101 may move the container along horizontal axis of motion 110, the motion thereby advantageously introducing additional separation forces in at least some cases. An optional wiper 106 is additionally provided, capable of motion along the horizontal axis of motion 110 and which may be removably or otherwise mounted onto the support base at 109.

Figure 2A:
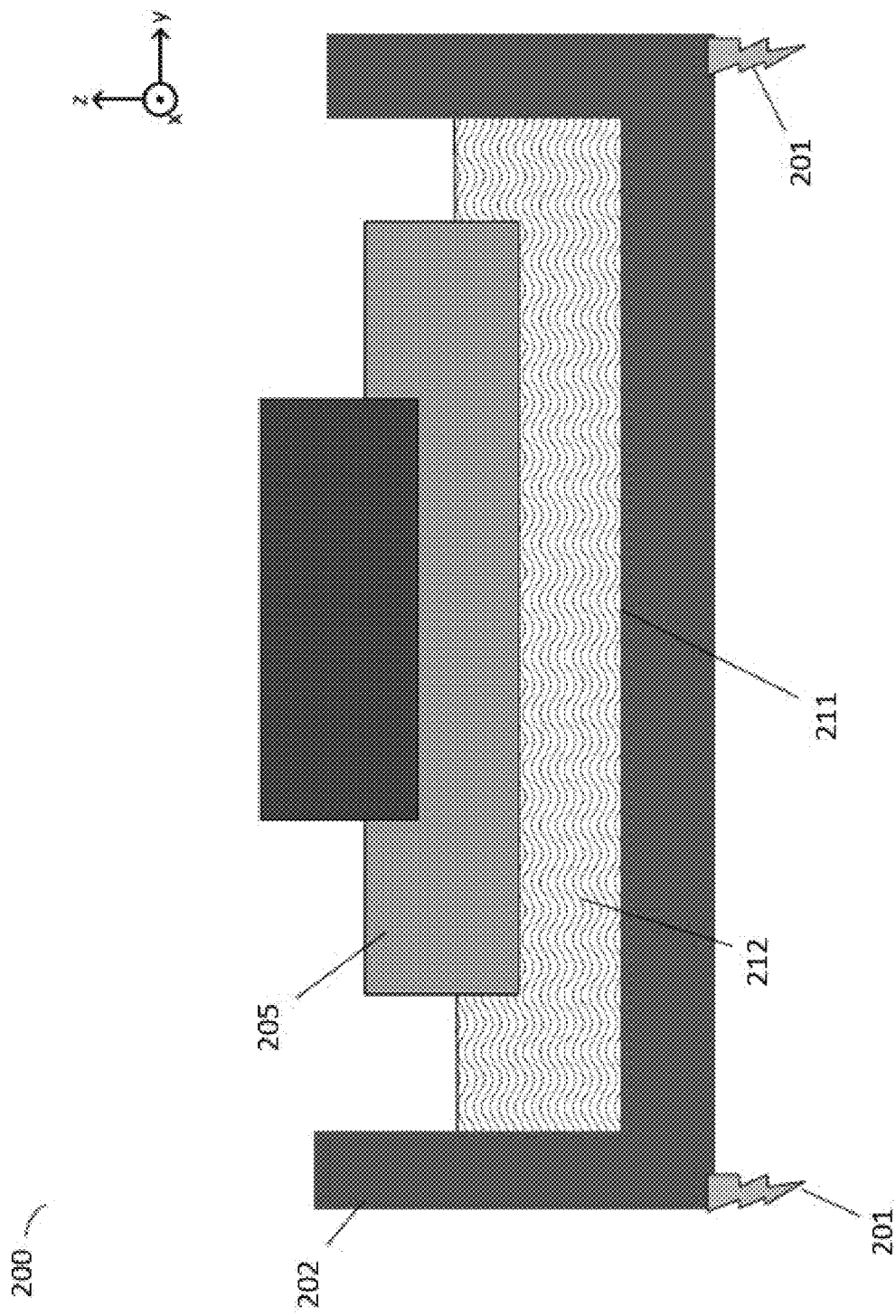
FIGS. 2A-2C depicts an illustrative additive fabrication system, according to some embodiments.
Figure 2B:
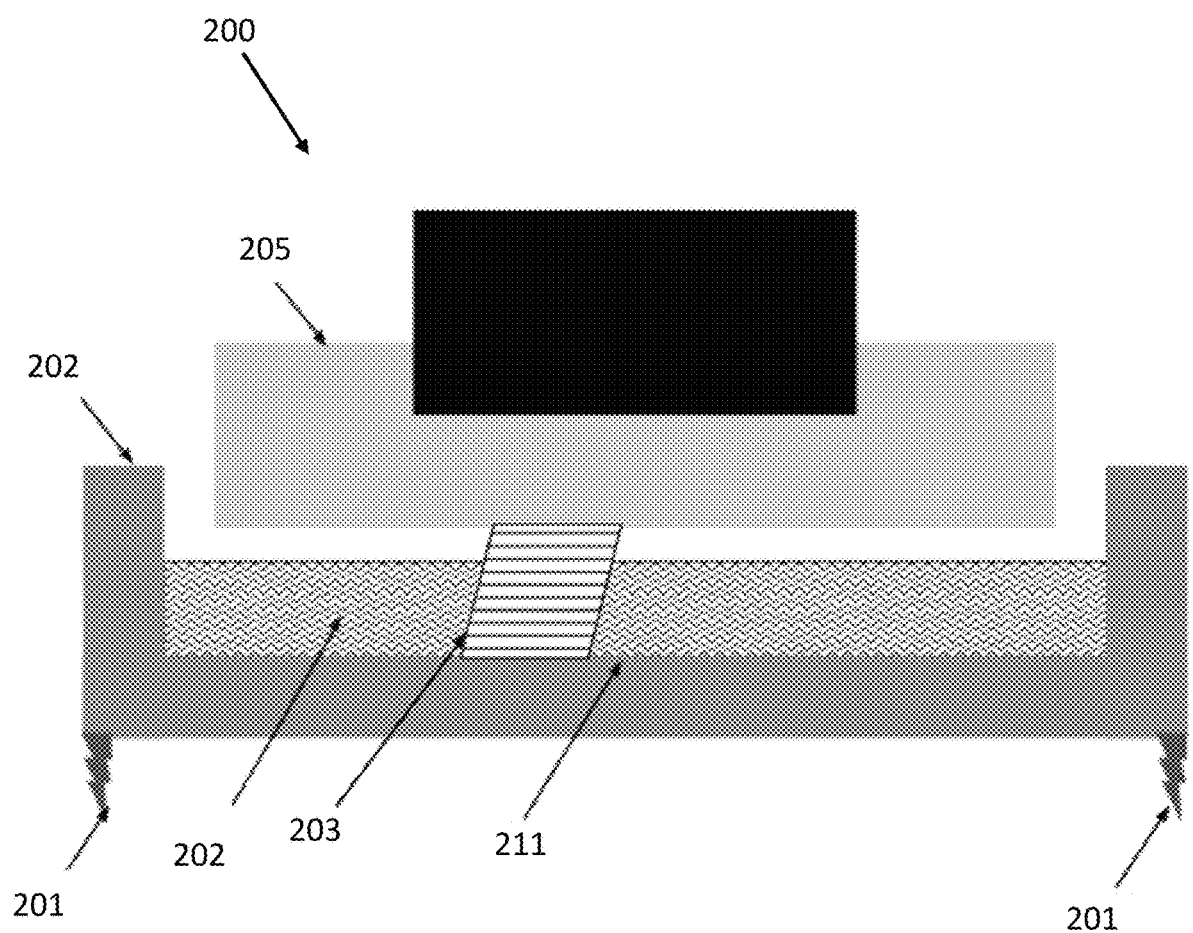

According to one or more embodiments, FIGS. 2A, 2B depict a schematic of an inverse stereolithographic printer 200. In the example of FIGS. 2A-B, stereolithographic printer 200 comprises a build platform 205, a container 202, a leveling mechanism 201, and liquid resin 212. The downward facing build platform 205 opposes the floor of container 211, which contains photopolymer resin 212.

FIG. 2A represents a configuration of stereolithographic printer 200 prior to formation of any layers of a part on build platform 205. Some or all of the photopolymer resin located between the build platform and the bottom of the container may be cured (e.g., by directing actinic radiation through the base of the container onto the resin as described above).

As described above, stereolithographic printers 100 and 200 shown in FIGS. 1A-B and FIGS. 2A-B, respectively, may cure layers of photopolymer resin in contact with both a desired build surface (e.g., the build platform 105 or 205 and/or a previously formed layer of material) and an opposing surface 111 or 211. Such an approach may be employed in systems sometimes known as "inverted" stereolithography machines, where actinic radiation is introduced through an optical window in the bottom of a container.

To illustrate one exemplary additive fabrication technique in which a part is formed in contact with a surface other than another layer or the build platform, an inverse stereolithographic printer is depicted after forming several layers of an object 203 in FIG. 2B.

According to one or more embodiments, the liquid resin may comprise a combination of oligomers, monomers, and photoinitiators. This basic liquid resin could optionally include pigments, dyes, and other specialty additives as well. The liquid resin may comprise a first component comprising one or more of the types of species listed above, as well as others. The first component of the liquid resin may be configured to cure upon exposure to actinic radiation. The liquid resin may further comprise a second component comprising one or more of the type of species listed above or others. The second component of the liquid resin may be configured to cure in response to an initiating event (e.g., application of heat). Liquid resins that include both first and second curing components are referred to herein as dual-cure resins. In one embodiment the liquid resin is dispensed from the dispensing system 104 into the container 102. With everything in place as discussed above with printer 100 or 200, the source of actinic radiation can be used to expose the liquid resin. The actinic radiation would cause the photoinitiators to form photo-reactive species. These photo-reactive species may then react with monomeric or polymeric components and initiate a cross-linking or further polymerization reaction. This polymerization causes the layer to cure in the cross section exposed to actinic radiation. This cross section adheres to either the build platform 205 or to the previous layer of the object 203. The object formed would be made of a polymeric material. The type and properties of the material would depend on the monomeric, oligomeric, and/or polymeric (meth)acrylates used as the base of the resin.

Figure 2C:
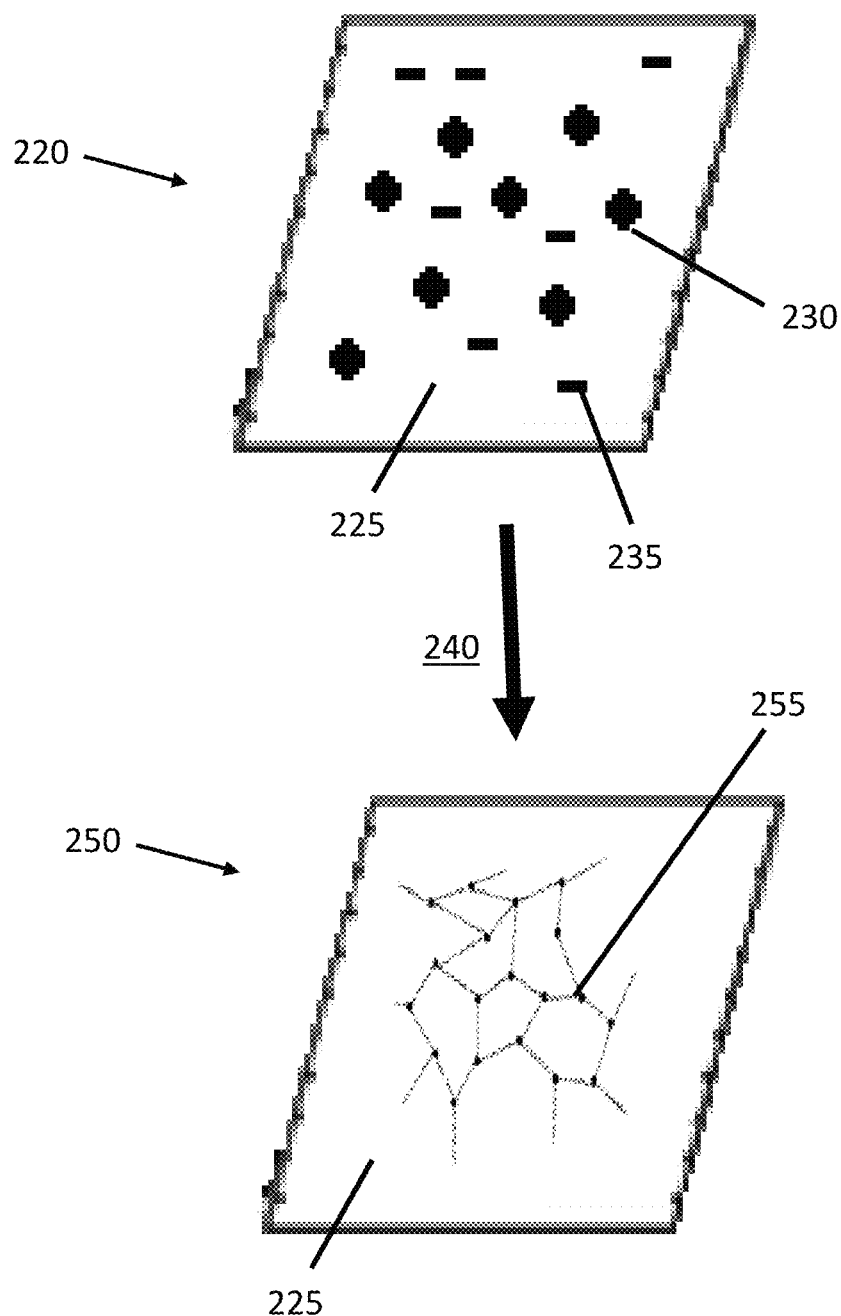

FIG. 2C shows an object 220 in a green state, according to one or more embodiments. The object 220 may be formed by the process of forming successive photo-cured layers 203, as discussed above with regard to FIG. 2B. The object 220 in the green state may comprise the photo-cured polymeric material 225, as well as a first precursor species 230 and a second precursor species 235 of a secondary component that has not yet undergone substantial secondary polymerization, i.e., is in a latent state. In the green state, object 220 has some defined structure given by the photo-cured polymer 225, but has not yet been fully cured to provide an object in its final state. The secondary component may be subjected to an initiating event 240 (e.g., application of heat) which causes a secondary polymerization process to occur to produce article 250. The final article comprises both the photo-cured polymer species or polymeric network 225, as well as the secondary polymer species or polymeric network 255. Mechanisms related to secondary curing are discussed further, herein.

Dual-cure resins for use in additive manufacturing are generally described herein. As used herein, the term "dual-cure resin" refers to a resin having at least two separate curing steps that may occur simultaneously or sequentially. For example, according to some embodiments of the invention, a dual-cure resin may comprise a first component configured to cure when subjected to actinic radiation and a second component in which curing is initialized through a separate event, such as the application of heat. Other mechanisms for initializing curing are also possible, as discussed herein.

Incorporating a secondary polymerization mechanism may make many more polymeric chemistries accessible to additive manufacturing leading to outstanding and diverse mechanical properties that would be difficult or impossible to achieve in a single-cure resin. According to one or more embodiments, the primary or initial cure step would rely on traditional additive manufacturing techniques to create a scaffolding or green article. Once the initial reaction constructs the desired object, the secondary reaction may take place and the desired properties, such as increased strength, may be attained. In some embodiments, a two-step cure may allow for time to adjust the shape or placement of the material while it is in a gel-like form before subjecting the article to the secondary cure mechanism that would more completely harden the material.

Embodiments presently disclosed fulfill a need in the industry for new polymeric materials with longer-term shelf stability and enhanced ranges of material properties. Some embodiments disclosed herein accomplish these goals by physically isolating a species of the secondary cure component such that it is entirely or substantially non-reactive until an initiating event (e.g., application of sufficient heat). Keeping the precursor species of the secondary cure physically isolated from one another at ambient conditions allows for the initial cure step to form a "green" structure or scaffold in the desired shape that can then undergo the secondary cure process to finalize the mechanical properties of the material, according to some embodiments.

The dual-cure resin may comprise a primary component for forming a first polymer and a secondary component for forming a second polymer. Each of the components may comprise one or more precursor species that cure, or react to form polymers (e.g., (meth)acrylate or polyurea), upon the initiation of certain conditions.

The primary component may comprise a photo-curable component configured to cure when subjected to an effective amount of actinic radiation. The cured polymeric material may be a type of (meth)acrylate or acrylate polymer. (meth)acrylates are useful in 3D printing applications because the monomers and oligomers are generally stable in ambient conditions. The photo-curable component may further comprise photo-initiator. With the addition of a photoinitiator and the relevant light source, the materials may become highly reactive through radical photopolymerization, and cure to form a polymer. The article formed at this stage may be referred to as a "green" article, indicative of the fact that further curing and strengthening may take place.

The resin may further comprise a secondary component configured to cure, or react to form a secondary polymer, upon the initiation of certain conditions. The secondary polymer may comprise a first secondary precursor species and a second secondary precursor species. According to certain embodiment, the first secondary precursor species is configured to be physically isolated or substantially physically isolated from the second secondary precursor species until subjected to an initiating event that allows the first and second secondary precursor species to mix and cure. The initiation event may be a stimulus such as heat, mechanical force (e.g., sonication), addition of a catalyst, or some other mechanism.

In some embodiments, isolating a precursor species of the secondary cure component allows the initial or primary cure reaction (e.g., photoreaction) to proceed without interference, while maintaining the secondary cure precursor species dispersed in the initially cured object. Once the initiation factor is provided, the active compound of the secondary cure is released and the secondary cure reaction can proceed. In some embodiments, isolation of a secondary precursor species (either through encapsulation or particularization) allows the resin to be created in a single cartridge system reducing waste and improving the customer experience.

Dual-cure resins disclosed herein may have long shelf and/or pot life. Delay of secondary curing (via physical isolation of a precursor species) may allow for a longer pot and/or shelf life for the dual-cure resin. As a result of its long shelf life, according to some embodiments, dual-cure resins disclosed herein may be manufactured and sold with the first and second cure components both already disposed in a single resin composition (e.g., in a single cartridge), thereby reducing the impact of human error or other complications related to properly mixing two compositions. In embodiments in which the first and second components are mixed post-sale by a consumer, the resulting liquid resin may have a shelf life and/or pot life of at least a week, a month, six months, or a year.

Prior to curing, the first and second secondary precursor species may reside in the same resin (for example, in the same pot or in the same chamber of a cartridge, or in the same "green" article), while the first secondary precursor species remains physically isolated or substantially physically isolated from the second secondary precursor species, thereby preventing premature curing. For example, the first precursor species of the secondary component may be encapsulated by a shell which presents a physical barrier physically isolating it from the second precursor species to prevent curing. In another example, the first species is present in the resin in an insoluble particle or a powder form, allowing only a small fraction of that precursor species (e.g., the small percentage of material at the surface of each particle) to be exposed to another precursor species, thereby substantially physically isolating the precursor species from one another. The physical isolation of the precursor species may then be eliminated upon the occurrence of an initiating event, allowing the precursors to mix and cure. For example, where one of the precursor species is encapsulated, the initiating event may be a degrading event—an event which causes the encapsulating shell to degrade and release the formerly physically isolated precursor species. In embodiments in which one of the precursors is suspended in particle form, the initiating event may be a dissolving event—an event which causes the particle comprising the precursor species to dissolve and release the formerly substantially physically isolated precursor species. The degrading or dissolving event may comprise any of application of heat or mechanical force (e.g., vibrational force), or introduction of a chemical species (e.g., a solvent or catalyst). Other mechanisms are also possible.

Embodiments described herein, in which different precursor species of a secondary component are physically isolated from one another even where both are present in the same resin mixture to prevent curing, may be distinguished from alternative mechanisms in which precursor species are prevented from curing due to a blocking chemistry mechanism. Resin compositions employing blocking chemistry bond a blocking functional group to one of the precursor species to prevent it from reacting with a second precursor species and curing. Once it is time to allow curing to take place, an intermediary reaction is triggered, for example, by the application of heat, to react and remove the blocking agent, allowing the two precursor species to proceed to cure. The presence of a blocker group on a precursor species does not constitute it being physically isolated, at least as that term is used herein.

Using blocked polymers for additive manufacturing application risks leaving small molecules in the final object, at least in some embodiments. These small molecules can be plasticizing agents. Plasticizer may affect the material properties or leach out of the finished object over time. Such leaching may make the object unsuitable for certain applications such as medical or food grade materials. Furthermore, potential solutions for removing blocking molecules may result in additional problems, such as reducing the speed at which the secondary cure step can proceed.

The approach of blocking chemistry has three primary disadvantages. (1) If the small molecule does not remain bound to the backbone after deblocking, it may act as a plasticizer potentially leaching out of the cured object affecting mechanical properties, biocompatibility, and may impact available applications overall. (2) Where the small molecule is bound in the backbone of the polymer network, the resulting reaction may have a slow cure rate and/or require a high curing temperature, as the blocking reaction will continue in the forward and reverse direction requiring long curing times and substantially high temperatures (3) The blocked isocyanate could be a urethane or urea compound, which is, by its nature, much higher in viscosity than its unblocked isocyanate counterpart due to hydrogen bonding with itself. For this reason, most commercially available blocked isocyanates (such as Baxenden Trixene BI series) have a very high viscosity for relatively low isocyanate contents. As such, only small amounts of the blocked isocyanates can be reasonably included in the resin while keeping the viscosity at printable levels. This limits the concentration of urethane/urea bonds in the postcured polymer network and thus limits the resulting materials properties. Additionally, with conventionally available blocked polymers, the reaction proceeds in ambient conditions at some level. This increases the viscosity of the material and decreases the pot life.

Figure 3A:
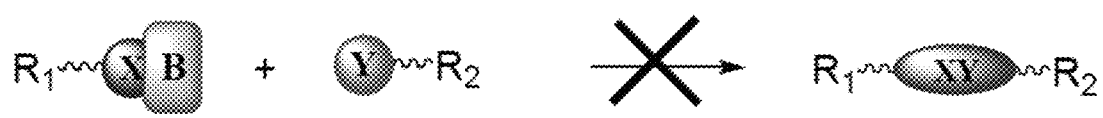
FIG. 3A depicts a schematic of a prevented chemical reaction due to the presence of a blocking agent bonded to one of the reactants.

FIG. 3A shows a schematic of chemical reaction prevented from taking place because of the presence of a blocking agent bonded to one of the reactants. In this case, some blocking agent "B" is attached to the isocyanate "X" and prevents it from reacting with the alcohol "Y" (or amine) to make a urethane (or urea) at ambient temperature. The same blocking principle could, of course, be applied to reactants different from those of this example.

Figure 3B:
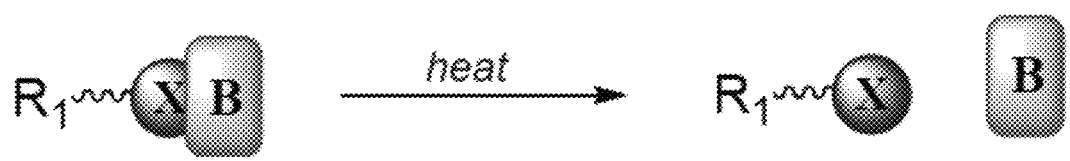
FIG. 3B depicts a schematic of a chemical reaction by which a blocking agent is removed.

FIG. 3B shows a schematic of a chemical reaction by which the blocking agent of FIG. 3A is removed from the isocyanate "X" by the application of heat, which would in turn allow the reaction to take place, which had previously been prevented by the blocking agent B as shown in FIG. 3A. The presence of the cleaved blocking agent B, however, can have an undesired plasticizing effect.

As already mentioned, the physical isolation or separation of secondary species may be accomplished with the use of encapsulants. According to one or more embodiments, the secondary component comprises a plurality of encapsulants containing a first secondary precursor species, wherein the plurality of encapsulants are configured to degrade, when subjected to a degrading event (e.g., application of an effective amount of heat), and release the first secondary precursor species for secondary curing. The encapsulant may comprise, for example, a wax or polymer shell. The encapsulant could be, for example, a wax or polymer shell that ruptures with phase transition or expansion of the inner encapsulated material when sufficient heat is applied. The secondary component may further comprise a second secondary precursor species configured to react with the released secondary precursor species to produce a secondary polymer.

The substantial physical isolation or separation of secondary species may, alternatively or additionally, be accomplished with the use of particles that are insoluble in the resin at ambient conditions. For example, according to one or more embodiments, the secondary component comprises a plurality of particles, in turn, comprising a first secondary precursor species. The plurality of particles may be configured to dissolve when subjected to a dissolving event (e.g., application of an effective amount of heat). Until subjected to the dissolving event, however, the plurality of particles may be configured to remain substantially undissolved. The insoluble particles may remain suspended and dispersed in the liquid photopolymer resin as it is hardened into the green article during the initial cure step. Once the initiation factor is provided (e.g., sufficient heat is applied), the particles may become more soluble in the hardened material, allowing the dissolved precursor species to mix with other precursor species and allow the second cure reaction to begin.

According to one or more embodiments, the different precursor species may be selected to form a desired secondary polymer. The secondary polymer may be a thermoset plastic. The secondary polymer may be, for example, a polyurea, a polyurethane, and/or an epoxy. Other secondary polymers are also possible.

The use of secondary polymers in addition to the primary polymer (e.g., methacrylate) can facilitate an expansion of available material properties. For example polyureas tend to have more desirable chemical, heat response, and resistance to aging. Additionally polyureas can be stronger with a higher elongation making the resulting material tougher and better able to withstand repeated use. Additionally, polyepoxides (epoxies) are a class of thermosetting polymer with desirable mechanical properties such as, temperature and chemical resistance. The following discussion relates to polyureas, polyuretheanes, and polyexpoxides, but can be applied to any number of polymer groups as one skilled in the art would understand.

In some embodiments, the secondary cure component may be configured to form a polyurea upon curing.

Figure 5:
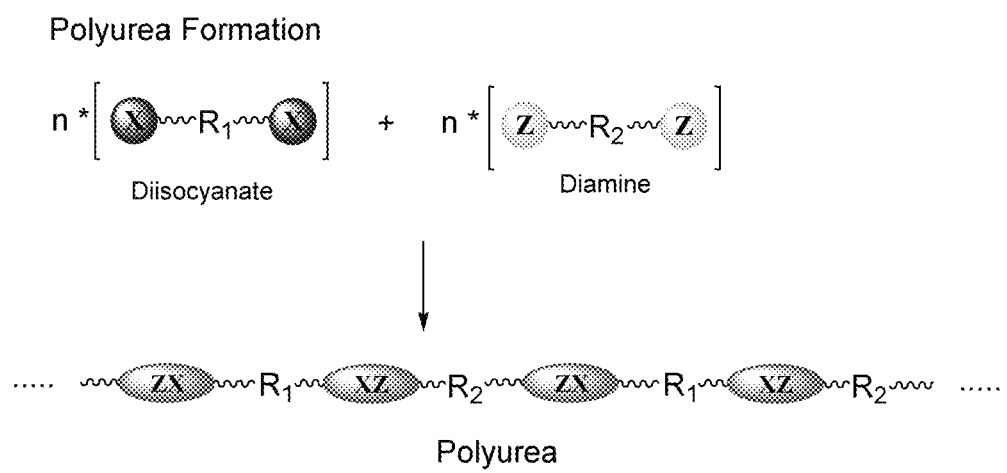
FIG. 5 depicts a schematic of polyurea formation, according to one or more embodiments.

In conventional polyurea synthesis, a two-step approach is typically used. For example, first, a small molecule diisocyanate monomer is reacted in excess with a large difunctional amine. Second, an amine-based chain extender is added to form the complete polymer. An example of a conventional polyurea synthesis is shown in FIG. 5. In some embodiments an optional amine accelerator may also be incorporated.

In embodiments of the present invention, where the secondary polymer is polyurea, at least one of the precursor species may be fully or substantially physically isolated from a second precursor species. For example, the first precursor species may be present in the form of insoluble particles. Alternatively, the first precursor species may be encapsulated.

The first precursor species (with limited exposure) may comprise an amine. It may comprise a polyamine. It may comprise a diamine, it may comprise dicyandiamide (DICY). The first precursor species (e.g., DICY) may be present in particle form or encapsulated. In some embodiments, the first precursor species may comprise 3,3' diaminodiphenyl sulfone high temperature aromatic amine curing agent.

The second precursor species (which is generally, although not necessarily, not isolated within the resin) may comprise an isocyanate species. For example, the second precursor species may comprise a polyisocyanate species. The second precursor species may comprise a diisocyanate species. Upon being introduced to each other the first and second precursor species react to form polyurea.

In some embodiments, the amine reactant may comprise an amine reactant that is present as an insoluble particle at ambient temperature and starts to dissolve at elevated temperatures. Increasing the temperature may improve the solubility and diffusion of the amine reactant which allows it to react. In some embodiments, dicyandiamide may be the amine reactant.

Use of DICY, instead of alternative traditional polyols or polyamines to form a a secondary polymer, may have several advantages. First, DICY-isocyanate based resins may be highly stable at ambient temperature and confer a much longer potlife (e.g., a pot life of several months or years). Second, use of DICY (or other particles) may be advantageous over use of liquid polyols which can lead to excessive leaching during postcure heating and even in the green state. Because DICY is a solid with a high melting point, leaching is not a concern. Use of a small molecule diamine, such as DICY, may aid in achieving high localized concentrations of urea groups upon the reaction of the amines with isocyanates, which may lead to even higher toughness polymers after postcuring. (Small molecule polyols usually have low melting points and often result in leaching at high temperatures.)

Figure 6:
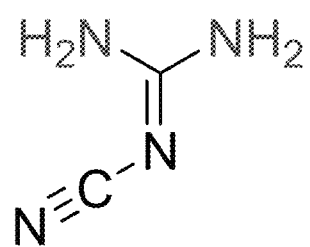
FIG. 6 depicts a representation of the chemical structure of dicyandiamide, according to one or more embodiments.

FIG. 6 depicts a representation of the chemical structure of dicyandiamide, according to one or more embodiments. As shown in FIG. 6, dicyandiamide includes two amine groups.

Figure 7:
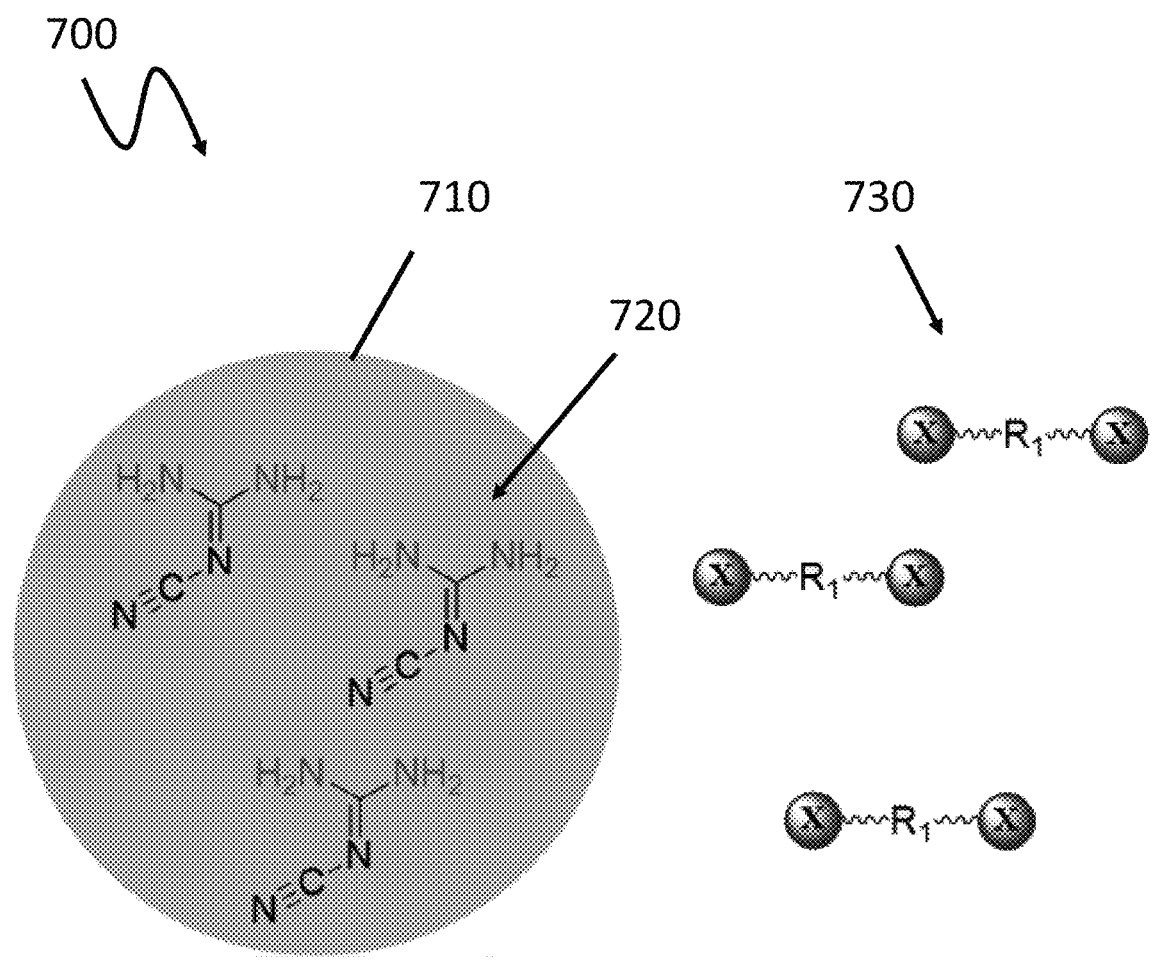
FIG. 7 depicts a schematic of dicyandiamide in a latent stage, according to one or more embodiments.

FIG. 7 depicts a schematic of a secondary component 700 during a latent stage, according to one or more embodiments. A particle 710 contains a precursor species 720. In this particular embodiment, the precursor species is dicyandiamide. The dicyandiamide 720 is present in particle form 710 and is substantially isolated from the companion precursor species 730, which in this embodiment comprises diisocyanate, substantially preventing the formation of a secondary polymer (e.g., polyurea) to occur at levels that would interfere with the printability of the resin. Such an arrangement, allows for an extended pot-life or shelf-life of a dual cure resin containing the secondary component 700.

Figure 8:
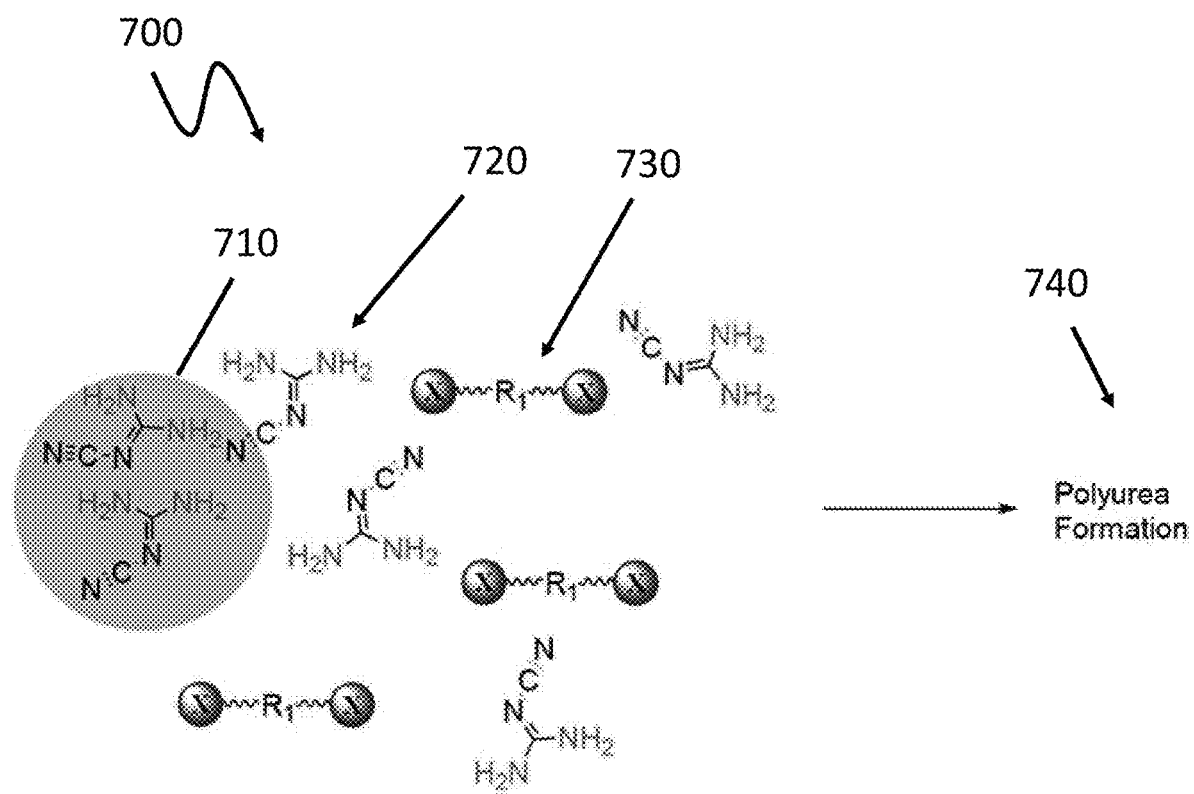
FIG. 8 depicts a schematic of dicyandiamide during particle dissolution, according to one or more embodiments.

FIG. 8 depicts a schematic of a secondary component 700 after being subjected to a dissolving event (e.g., application of heat), according to one or more embodiments. The dissolution of particle 710 causes the precursor species 720, which in this embodiment comprises dicyandiamide, to be released and to mix and react with the companion precursor species 730 (e.g., diisocyanate) to form a secondary polymer 740 (e.g., polyurea). While the embodiments shown in FIGS. 7 and 8 incorporate dicyandiamide and diisocyanate, the same principal could be applied using different precursor species and/or to form a different secondary polymer. Likewise, in some embodiments an initiating event other than the application of an effective amount of heat, could be used to cause particle dissolution, such as addition of a catalyst.

In some embodiments, the secondary cure component may be configured to form a polyurethane.

Figure 4:
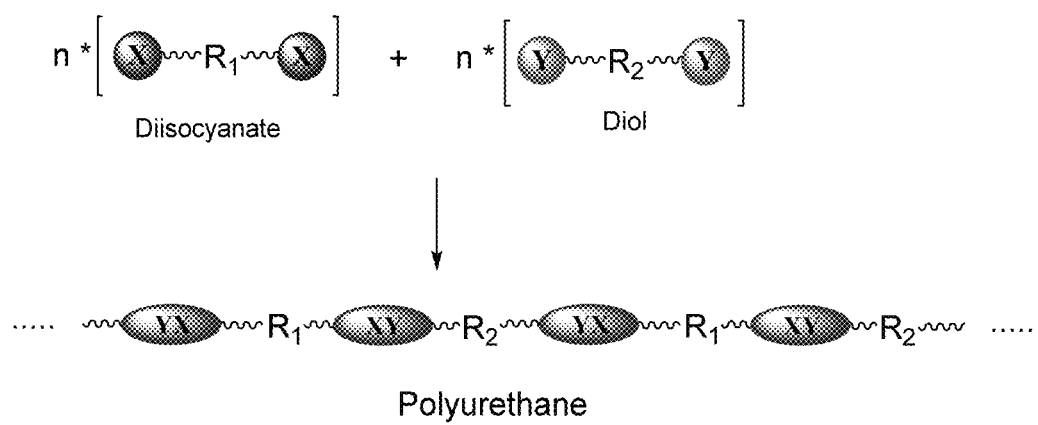
FIG. 4 depicts a schematic of polyurethane formation, according to one or more embodiments.

In conventional polyurethane synthesis, a two-step approach is typically used. For example, first, a small molecule diisocyanate monomer is reacted in excess with a large difunctional polyol. This first step may produce oligomeric isocyanates. Second, a small hydroxyl-based chain extender is added to form the complete secondary polymer. In some embodiments, the chain extender may be a polyol species or a polyamine species. An example of a conventional polyurea synthesis is shown in FIG. 4. In some embodiments an optional accelerator may be incorporated.

In some embodiments configured to form polyurethane as the secondary polymer, the first precursor species (e.g., the isolated species) may comprise at least one of a chain extender and cross-linking agent. In some embodiments the chain extender or cross-linking agent may be encapsulated. Chain extenders and crosslinkers are discussed further herein.

In embodiments configured to form polyurethane, a second precursor species (which may be not encapsulated, not in particle form, or not otherwise isolated from the rest of the resin) may comprise an oligomeric isocyanate species. Upon being introduced, the precursor species may react to form polyurethane.

In some embodiments, the secondary cure component may be configured to form a polyepoxide, or epoxy. The first precursor species (with limited exposure) may comprise an amine. For example, it may comprise a polyamine. In some embodiments, the first precursor species may comprise a diamine. In some embodiments, the first precursor species may comprise dicyandiamide (DICY). The dicyandiamide may be present in particle form as discussed above, in related to dicyandiamide's potential use in forming polyurea.

The second precursor species (generally, but not necessarily, present in an unenecapsulated or non-particle form) may comprise an epoxide. Potential epoxy precursor species include Epon 828 (bisphenol A diglycidyl ether). In some embodiments, an amine accelerator may be incorporated into the process when forming epoxies, e.g. Ancamine 2442. Upon being introduced to each other after the initiating event, the first and second species may react to form an epoxy.

In embodiments where the secondary component comprises a plurality of particles, the particles may comprise dicyandiamide (DICY, also known as cyanoguanidine). DICY is a latent-curing agent which can be prepared as a powder dispersion in the liquid resin. For example, DICY may be used as a precursor for polyurea or epoxy formation.

The chemical structure of DICY, and the fact that it is an insoluble micronized powder, may result in an extremely low reaction rate at ambient temperature, both for epoxy-amine and isocyanate-amine curing mechanisms, allowing for improved shelf-life and pot-life. Some embodiments may incorporate micronized powders of DICY that are commercially available, such as those available from AIR PRODUCTS under the AMICURE brand name and from CVC THERMOSET SPECIALTIES under the OMICURE brand name. In some embodiments, the DICY powder may be OMICURE DDA5 from CVC SPECIALTIES, which has an average particle diameter of about 4 μm. The DICY powder may be used in combination with amine accelerator agents, such as ANCAMINE 2442 from AIR PRODUCTS, which serve to lower the cure temperature of the curing reaction to 120-150° C. These accelerators are often solids ground to ultra-fine particle size which are insoluble in resins at room temperature.

According to one or more embodiments, physical isolation of one or more secondary precursor species may be achieved by encapsulation of the species. The precursor species may remain isolated in the encapsulant, until an event triggers the degradation of the capsule and release of the precursor species. In some embodiments the encapsulated precursor species may be a chain extender and/or crosslinker species. In some embodiments, upon release from the encapsulant, the chain extender and/or crosslinker species may react with a precursor oligomer (e.g., a diisocyanate oligomer) to form polyurethane.

In some embodiments, precursor oligomers may be strengthened into a polymeric network by bonding with chain extender and/or crosslinker species. The links between precursor molecules are formed by reaction with chain extenders and/or crosslinkers that can react with functional groups from two or more separate oligomers. Both chain extenders and crosslinkers are low-molecular multifunctional species: Difunctional products can react to form a linear extended structure, and are generally referred to as chain extenders; Tri- and other multifunctional entities can react to form a tridimensional lattice, they are crosslinkers. However, in practice, sometimes usage of the two terms overlaps.

During the formation of, for example, polyurethane, chain extenders and/or crosslinkers may be used to join the end groups of isocyanate oligomers. Chain extenders and/or crosslinkers may be used to limit, or extend the rotation and conformation of oligomeric molecules. They can also be used to control the cross link density, or partial crystallization of the final structure of the polymer formed. Both of these parameters control the ability for the oligomers to organize and phase separate into microdomain regions, which, in turn, controls the final mechanical properties of the bulk polyurethane. Chain extenders are generally highly reactive molecules, often containing either an amine in the structure itself or as a separate catalyst.

In some embodiments, short diamines, diols, and/or triols are used as chain extenders and comprise the core of capsules protected by low molecular weight polyolefins or waxes as the shell material. In some embodiments, the chain extenders may comprise triethylene glycol, glycerol, hexamethylenediamine, and/or triethanolamine. Some embodiments may further comprise an additional catalyst, for example, dibutyltin dilaurate and/or DABCO.

In some embodiments, the encapsulant may comprise a polymer species. In some embodiments, the encapsulant may comprise a polyolefin wax. In some embodiments, the encapsulant may be selected to have a particular melting point. In some embodiments, the encapsulant is configured to degrade and release its contents when the composition is heated to reach the melting point temperature, allowing for secondary curing and the formation of the secondary polymer (e.g., polyurethane network). The melting point of the encapsulant should be sufficient to survive a range of shipping and storage temperatures, but not so high that damage to a first stage cure (e.g., photocured methacrylate component) would be incurred prior to the encapsulant melting. The encapsulant size selected may depend on various parameters. In some embodiments, the encapsulant diameter is from about 1 micron to about 50 microns.

Figure 11:
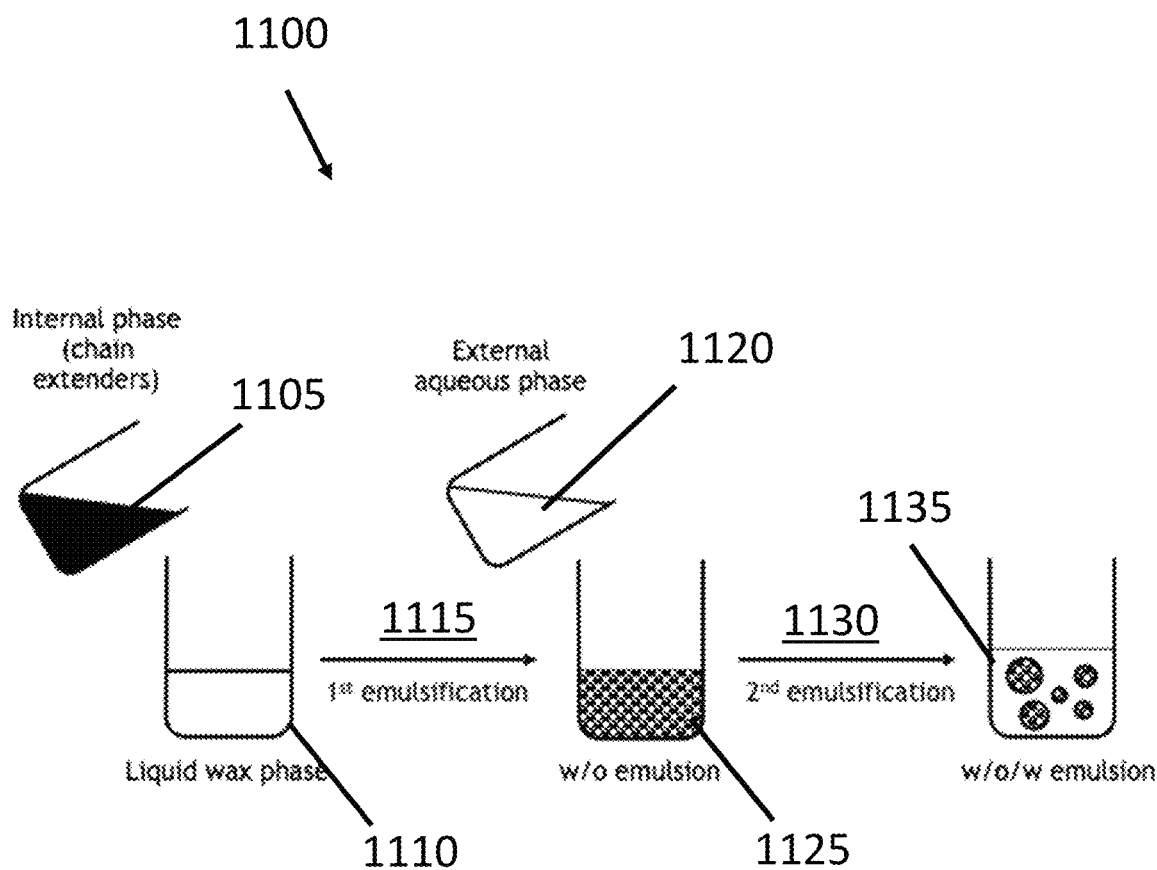
FIG. 11 depicts a schematic of an encapsulation process of a chemical species in wax shells, according to one or more embodiments.

Encapsulation of a secondary precursor species (e.g., chain extender) may be achieved through different processes, as would be understood by a person of ordinary skill in the art. FIG. 11 shows a representative encapsulation process 1100. In the process 1100, According to some embodiments, a step 1115 is to form an emulsion 1125 (e.g., water in oil emulsion) of the precursor species (e.g., chain extender) 1105 in a bulk liquid wax phase 1110 above its respective melting point. In a subsequent step 1130, this first emulsion 1125 may then be emulsified in an external aqueous (e.g., polyvinyl alcohol or "PVA") solution 1120 to form a second emulsion 1135 (e.g., water in oil in water emulsion.

Emulsification may be performed with, for example, a T25 ultraturrax homogenizer, a tip ultrasonicator, a membrane emulsifier, or a microfluidic device. Cooling while maintaining the emulsion allows for solidification of the wax shell and therefore, formation of capsules. The capsules may be washed with pure water to remove the surfactant and any surface contaminates. The capsules may be dried under ambient conditions or using any drying methods known in the art including but not limited to low pressure partial vacuum drying, forced convection drying, spray drying, or lyophilization. The microcapsules may then mixed into a composition with another secondary precursor species (e.g., isocyanate oligomer) and a first, photocurable component (e.g., an acrylate-based component) at the proper stoichiometric amount or some amount more than the stoichiometric amount to ensure full reaction. At this stage, the composition may be ready for use in stereolithographic printing.

In some embodiments, the wax shell may be degraded by heating the composition, after a first photocuring stage, allowing the chain extenders to mix and interact with the isocyanates bound into the acrylic network formed during printing and building a crosslinked polyurethane network inside the acrylic matrix.

The secondary component may comprise additional precursor species. For example, according to some embodiments, a second precursor species may comprise an isocyanate species. In some embodiments, the isocyanate species may be an isocyanate-terminated oligomer. In some embodiments, use of an isocyanate oligomer may provide advantages such as reduced toxicity as compared to small molecule isocyanates. Additionally, the multi-functional oligomers may allow for a greater breadth of characteristics as the oligomeric components may be tailored for specific properties. For example, in some embodiments, the oligomeric components may be tailored to allow for photopolymerization while the isocyanate-terminated region remains available for use in a second reaction resulting in formation of a secondary polymer.

Figure 9:
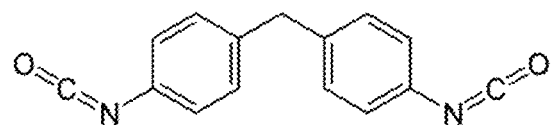
FIG. 9 depicts a chemical structure of a diisocyanate monomer species, according to one or more embodiments.
Figure 10:
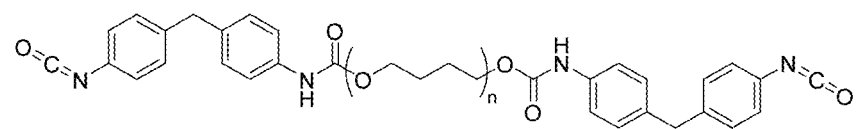
FIG. 10 depicts a chemical structure of a diisocyanate oligomer species, according to one or more embodiments.

FIG. 9 depicts the chemical structure of an diisocyanate monomer [4,4' methylene diphenyl diisocyanate], according to one or more embodiments. FIG. 10 depicts the chemical structure of MDI-PolyTHF-MDI diisocyanate oligomer, according to one or more embodiments. The oligomers may further comprise diol species. In some embodiments, the isocyanates (both 2,4 and 4,4 methylene diphenyl diisocyanate[MDI]) are reacted at suitable stoichiometric ratios with different diols to control mechanical properties. Longer more flexible diol molecules result in higher elongation, often softer elastomeric urethanes. In some embodiments, the diols may be linear hydrocarbon diols, polyethylene glycols [PEG] and polytetrahydrofuran [PTHF]. In some embodiments, the first NCO group on the MDI is far more reactive than the second. In some embodiments, limiting the amount of hydroxyl [OH] groups to a ratio of 2 NCO per reactive OH or NH on the polyol or diamine allows for the creation of oligomeric versions of the polyol chain capped with two MDI groups each with one unreacted NCO moieties on either end.

In some embodiments, oligomeric formation may be done in bulk phase with agitation as well as heating and cooling, as needed, giving sufficient time for the reaction to proceed to completion. The ratio of short rigid MDI molecule to flexible polyol may affect the properties of the final polyurethane. According to some embodiments, shorter linear polyol chains result in lower elongation, while longer linear polyol chains result in higher elongation more flexible materials.

Resin formulations may further comprise various additives. For example, in some embodiments, the resin may comprise treated and/or untreated fumed silica (e.g., AEROSIL 200) to mitigate settling of particles or capsules. Rubber toughening agents (e.g. Albidur EP 2240 A epoxy-coated silicone core-shell particles) may also be used in some embodiments. Other additives may also be used.

Pot life is the term of usability for a mixture typically determined under ambient conditions. Additive manufacturing techniques may require a long pot life such that a mixture is usable for the duration of the print. Print times may range from very short times of just a few minutes to multiple days. Additionally, it may be advantageous to extend the pot life much beyond the duration of a single print, such that the consumer may experience the greatest ease of use with minimal wasted material.

Shelf life is the term of usability for a mixture typically determined from manufacture until final use, and under a variety of conditions and temperatures that could be expected during shipping and storage, as well as ambient conditions or in the printer itself. It may be advantageous to extend the shelf life of a resin to a sufficient length of time, so as to allow the resin to be pre-mixed at a manufacturing stage, rather than mixed by a user post-purchase. It may be advantageous to have a shelf life of one month, three months, a year, or longer.

Improved pot and shelf life of the resin is facilitated, in part, by having the secondary polymerization component remain dormant for long periods of time under ambient conditions (e.g., ambient temperature and moisture). Premature gelation or viscosity increases in the liquid resin, as the result, for example, of reaction in the presence of moisture, may reduce pot/shelf life. As portions of the secondary component react, the viscosity increases, in turn impacting various mechanisms of the additive manufacturing process such as separation of the object from the container and material mobility for printing subsequent layers, and reducing the term of usability of the resin.

Accordingly, the methods and compositions described herein, in which a first precursor species is fully or substantially physically isolated from a second precursor species until an initiating event, may provide for improved pot and shelf life.

According to one or more embodiments, the liquid resin may have a viscosity of from about 1 cP to about 10,000 cP, or of from about 1,000 cP to about 5,000 cP, when measured at a temperature 30° C. Other values are also possible.

In some embodiments, the photocurable component and the secondary component are present in the dual-resin formulation at certain ratios by weight. For example, in some embodiments, the ratio by weight of photocurable component to secondary component is from about 20:80 to about 80:20, or from about 40:60 to about 60:40 or at about 50:50. In some embodiment the ratios of first component to second component may be selected to balance the desire for high secondary polymer content to the desire for a high strength in the "green" state (i.e. prior to curing the secondary polymer).

Within the secondary component, a first protected or isolated precursor species may be present in a certain ratio to a second unprotected precursor species so as to provide the correct stoichiometric amounts to allow the reaction to proceed, or some amount more than the stoichiometric amount to ensure full reaction. Such a ratio will depend on the molecular weight of the different species.

According to one or more embodiments in which heat is applied to release a secondary precursor species (e.g., either by dissolving particles or degrading capsules), the dissolution or degradation may occur at a temperature selected to be high enough to avoid premature release (e.g., during fluctuations in shipping and storage temperatures), but not so high that the temperature would damage the green structure formed by a photocured component. In some embodiments the temperature of release may be between 60° C. and 180° C., between 100° C. and 160° C., or between 140° C. and 150° C. Other temperature ranges are also possible.

One issue with using an insoluble particle or capsule component in the liquid resin is the effect it may have on the viscosity of the final liquid photopolymer. For this reason, the particle or capsule size of any material considered is an important factor. Particle size affects (a) how well the particles or capsules stay in suspension, and (b) ability to minimize the impact on print layer thickness. In some embodiments, particles or capsules are between 0.1 micron and 200 micron in diameter on average, or between 1 micron and 30 micron in diameter on average. Other sizes are also possible. Smaller particles or capsules may be more optimal by reducing the viscosity of the resin, remaining better suspended, and not interfering with layer thickness.

The compositions and resins described above may be incorporated into methods for additively manufacturing articles.

Methods may comprise providing a dual-cure resin comprising a photo-curable component and a secondary component, according to one or more embodiments of the invention described above.

Methods may further comprise subjecting the photo-curable component to actinic radiation to produce a photo-cured polymer. The step of subjecting the photo-curable component to actinic radiation to produce the photo-cured polymer may comprise forming successive layers of the photo-cured polymer to produce a green article comprising the secondary component.

Methods may further comprise subjecting the secondary component to an initiating event to allow a previously isolated or substantially isolated precursor species to react with a second precursor species to form a secondary cure and provide a manufactured article. The secondary cure may comprise a secondary polymer, such as a polyurea, polyurethane, or epoxy, as described herein. In some embodiments, the initiating event may occur while the article is a green article (i.e., after the photo-curing step).

In embodiments in which a precursor species is contained in a plurality of particles, the initiating event may be a dissolving event in which the particles are dissolved, releasing the precursor species. In embodiments in which the precursor species is encapsulated, the initiating event may be a degrading event, in which the capsules are degraded, releasing the precursor species.

While some of the above description has focused on the application of heat as an initiating event for causing dissolution of particles or degradation of encapsulants, it should be understood that other mechanisms may be applied. As discussed above, the initiating event (e.g., dissolving or degrading event) may be accomplished by a variety of mechanisms: applying an effective amount of heat; applying an effective mechanical force (e.g., vibrational force); introducing a chemical species (e.g., a solvent or a catalyst). In some embodiments, application of an effective mechanical force comprises use of sonication to degrade an encapsulant (e.g., a polymeric encapsulant) to release a secondary precursor species. Sonication is known to cause degradation and cleavage of polymers. It is possible to selectively adjust the process to break particular bonds. It would also be possible to introduce a chemical species such as a solvent or catalyst to cause degradation of an encapsulant or dissolution of a particle.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A dual-cure resin for use in additive manufacturing, comprising:
   a photo-curable component configured to cure when subjected to an effective amount of actinic radiation; and
   a secondary component comprising a first secondary precursor species isolated from a second secondary precursor species, the first secondary precursor species and the second secondary precursor species configured to react when subjected to an initiating event.

2. A dual-cure resin as in claim 1, wherein the first secondary precursor species is physically isolated from the second secondary precursor species.

3. A dual-cure resin as in claim 1, wherein the first secondary precursor species is insoluble with the second secondary precursor species at room temperature.

4. A dual-cure resin as in claim 1, wherein the first secondary precursor species comprises a blocking agent configured to prevent reaction of the first secondary precursor species and the second secondary precursor species, until occurrence of the initiating event.

5. A dual-cure resin as in claim 1, wherein the second secondary precursor species comprises dicyandiamide.

6. A dual-cure resin as in claim 1, wherein isolation prevents reaction between the first secondary precursor species and the second secondary precursor species, until subjected to the initiating event.

7. A dual-cure resin for use in additive manufacturing, comprising:
   a photo-curable component configured to cure when subjected to an effective amount of actinic radiation; and
   a secondary component comprising dicyandiamide and a secondary precursor species configured to react with dicyandiamide when subject to an initiating event.

8. A dual-cure resin for use in additive manufacturing, comprising:
   a photo-curable component configured to cure when subjected to an effective amount of actinic radiation; and
   a secondary component comprising a plurality of particles comprising a first secondary precursor species, wherein the plurality of particles are configured to dissolve when subjected to a dissolving event.

9. The dual-cure resin of claim 8, wherein the dissolving event comprises application of an effective amount of heat.

10. The dual-cure resin of claim 8, wherein the dissolving event comprises application of an effective mechanical force.

11. The dual-cure resin of claim 10, wherein the effective mechanical force comprises a vibrational force.

12. The dual-cure resin of claim 8, wherein the dissolving event comprises introduction of a chemical species.

13. The dual-cure resin of claim 12, wherein the chemical species comprises at least one of a solvent or a catalyst.

14. The dual-cure resin of claim 8, wherein the plurality of particles are configured to remain substantially undissolved until subjected to the dissolving event.

15. The dual-cure resin of claim 8, wherein the secondary component is configured to produce a secondary polymer comprising one of a polyurea or an epoxy.

16. The dual-cure resin of any of claim 8, wherein the first secondary precursor species comprises an amine species.

17. The dual-cure resin of claim 16, wherein the amine species comprises dicyandiamide.

18. The dual-cure resin of claim 8, wherein the secondary component further comprises a second secondary precursor species configured to react with the dissolved first secondary species to produce a secondary polymer.

19. The dual-cure resin of claim 18, wherein the second secondary precursor species comprises a diisocyanate species.

20. The dual-cure resin of any of claim 8, wherein the dual-cure resin is configured to have a shelf-life of at least six months.

21. The dual-cure resin of any of claim 8, wherein the dual-cure resin is configured to have a viscosity of between 1 cP and 10,000 cP at 30° C.

* * * * *